US010213975B2

(12) United States Patent
Lindsay et al.

(10) Patent No.: US 10,213,975 B2
(45) Date of Patent: Feb. 26, 2019

(54) AUTOMATIC SYSTEM AND METHOD FOR MOUNTING AND DISMOUNTING TIRE CASING ON EXPANDABLE RIM HUB IN RETREADING OPERATIONS

(71) Applicant: Bridgestone Bandag, LLC, Muscatine, IA (US)

(72) Inventors: John S. Lindsay, Weidman, MI (US); John R. White, Bettendorf, IA (US)

(73) Assignee: Bridgestone Bandag, LLC, Muscatine, IA (US)

( * ) Notice: Subject to any disclaimer, the term of this patent is extended or adjusted under 35 U.S.C. 154(b) by 0 days.

(21) Appl. No.: 15/300,482

(22) PCT Filed: Feb. 13, 2015

(86) PCT No.: PCT/US2015/015785
§ 371 (c)(1),
(2) Date: Sep. 29, 2016

(87) PCT Pub. No.: WO2015/153002
PCT Pub. Date: Oct. 8, 2015

(65) Prior Publication Data
US 2017/0173903 A1 Jun. 22, 2017

Related U.S. Application Data

(60) Provisional application No. 61/974,755, filed on Apr. 3, 2014.

(51) Int. Cl.
*B60C 25/14* (2006.01)
*B29D 30/54* (2006.01)
*B29D 30/00* (2006.01)

(52) U.S. Cl.
CPC ......... *B29D 30/0016* (2013.01); *B29D 30/54* (2013.01); *B60C 25/14* (2013.01);
(Continued)

(58) Field of Classification Search
CPC ............... B29D 30/0016; B29D 30/54; B29D 2030/0027; B29D 2030/0033;
(Continued)

(56) References Cited

U.S. PATENT DOCUMENTS 2,546,988 A * 4/1951 Herr ...................... B60C 25/132
157/1.24
2,872,704 A * 2/1959 Schaevitz .............. B29D 30/54
156/127
(Continued)

FOREIGN PATENT DOCUMENTS

| CN | 101279575 A | 10/2008 |
| CN | 102177011 A | 9/2011 |
| WO | 2012052970 A1 | 4/2012 |

OTHER PUBLICATIONS

Snap on Equip SRL Unico Socio (IT), English_abstract_of_CN101279575A, dated on Oct. 8, 2008.
(Continued)

Primary Examiner — Robert J Scruggs

(57) ABSTRACT

A loader device includes a support pedestal movable over a range of longitudinal travel along a longitudinal axis, a support carriage movably mounted to the support pedestal, a loader actuator, and a dismount actuator. The support carriage is movable over a range of vertical travel along a normal axis, which is perpendicular to the longitudinal axis. The support carriage has a support arm adapted to support a tire casing. The loader actuator and dismount actuator are respectively adapted to selectively move: (1) at least a portion of a tire casing supported upon the support carriage in a loading direction along the longitudinal axis off of the support arm onto the expandable rim hub and (2) at least a portion of a tire casing supported upon the expandable rim
(Continued)

hub in an opposing unloading direction off of the expandable rim hub and onto the support arm of the loader device.

25 Claims, 15 Drawing Sheets

(52) U.S. Cl.
CPC ............... *B29D 2030/0027* (2013.01); *B29D 2030/0033* (2013.01); *B29D 2030/541* (2013.01); *B29D 2030/549* (2013.01)

(58) Field of Classification Search
CPC ............ B29D 2030/549; B60C 25/145; B60C 25/132; B60C 25/00; B60C 25/02; B60C 25/14
See application file for complete search history.

(56) References Cited

U.S. PATENT DOCUMENTS

| | | | |
|---|---|---|---|
| 4,781,233 A * | 11/1988 | Williams | B23B 31/16 157/16 |
| 5,307,854 A * | 5/1994 | Brewer | B24B 5/366 157/13 |
| 5,332,020 A | 7/1994 | Brunner | |
| 5,354,406 A | 10/1994 | King et al. | |
| 5,941,294 A | 8/1999 | Cunningham et al. | |
| 6,135,185 A | 10/2000 | Cuckrovani | |
| 6,251,204 B1 | 6/2001 | Andersson et al. | |
| 7,108,036 B2 | 9/2006 | Spaggiari | |
| 7,395,849 B2 | 7/2008 | Corghi | |
| 7,404,427 B2 | 7/2008 | Hillman et al. | |
| 8,196,637 B1 * | 6/2012 | Story | B60C 25/0545 157/1.1 |
| 8,250,915 B1 | 8/2012 | Voeller et al. | |
| 8,613,303 B1 * | 12/2013 | Hanneken | B60C 25/056 157/1.17 |
| 9,168,797 B2 * | 10/2015 | Ferrari | B60C 25/0506 |
| 2004/0016293 A1 | 1/2004 | Weiss | |
| 2004/0256057 A1 | 12/2004 | Gridley et al. | |
| 2005/0016663 A1 * | 1/2005 | Lockridge | B29D 30/54 156/127 |
| 2005/0247409 A1 | 11/2005 | Corghi | |
| 2009/0236046 A1 | 9/2009 | Mimura | |
| 2009/0236047 A1 | 9/2009 | Mimura | |
| 2009/0236048 A1 | 9/2009 | Mimura | |
| 2010/0071855 A1 | 3/2010 | Immler | |
| 2010/0230033 A1 * | 9/2010 | Takada | B29D 30/0016 156/110.1 |
| 2011/0042875 A1 | 2/2011 | Story | |
| 2011/0284170 A1 | 11/2011 | Lemser et al. | |
| 2013/0206341 A1 | 8/2013 | Ferrari | |

OTHER PUBLICATIONS

Bridgestone Corp., English_abstract_of_CN102177011A, dated on Sep. 7, 2011.
Lee, Chang Ho, International Search Report and Written Opinion, dated Jun. 16, 2015, pp. 1-11, Korean Intellectual Property Office, Daejeon Metropolitan City, Republic of Korea.
European Search Report, dated Nov. 28, 2017.
European Search Opinion, dated Nov. 28, 2017.

* cited by examiner

AUTOMATIC SYSTEM AND METHOD FOR MOUNTING AND DISMOUNTING TIRE CASING ON EXPANDABLE RIM HUB IN RETREADING OPERATIONS

TECHNICAL FIELD

This patent disclosure relates generally to systems and methods for retreading tires, and more particularly to systems and methods for automatically mounting and dismounting a tire casing on an expandable rim hub in a retreading operation.

BACKGROUND

Devices for removing the tread of worn tires, often called "buffers" or "raspers," are well known. Tire buffing is part of a typical tire retreading operation.

Typically, the tire casing selected for retreading is buffed to remove excess rubber to provide a substantially evenly-textured crown for receiving a pre-cured tread strip and to provide a predetermined tire casing profile. Tire casings usually include a belt package (a package of steel belts or cables) underlying the road-engaging surface (e.g., the original tread) of the tire. The casing is buffed, generally to a predetermined characteristic crown radius corresponding to the upper contour of the belt package. The shoulder of the casing also can be buffed (trimmed) to eliminate or reduce voids or patterns in the shoulder created by the original tread and to provide a desired profile between the casing side walls and the crown.

Typically, an operator buffs a tire casing by directing a buffer over a multiplicity of tread removal passes, substantially in a sideways, pass-after-pass method. Known manual devices that require an operator to physically direct the buffing machine's removal direction and speed produce time periods between tread removal passes where the rate of tread rubber removal are less than optimal.

Furthermore, known automated devices rely on an operator to manually assist in the mounting of a worn tire casing to the automated buffer and the unloading of the buffed casing from the buffer. Accordingly, an operator is typically assigned to the buffing station (and other stations in the retreading process in which the tire casing is mounted to a tire hub assembly) and is limited in his ability to move from that area to work in other processing areas of a retreading facility.

Thus, there exists a need for a tire buffing machine which is easy to use and which improves tire buffing efficiency. As a related matter, there is a need for tire buffing systems and methods for tire buffing with enhanced automated capabilities. In addition, there exists a need for means for facilitating the mounting and dismounting of a tire casing on an expandable rim hub in other retreading operations, such as, at a skiving station. The present disclosure is directed to addressing these and other needs in the tire industry.

It will be appreciated that this background description is intended to aid the reader, and is not to be taken as an indication that any of the indicated problems were themselves appreciated in the art. While the described principles can, in some respects and embodiments, alleviate the problems inherent in other systems, it will be appreciated that the scope of the protected innovation is defined by the attached claims, and not by the ability of any disclosed feature to solve any specific problem noted herein.

SUMMARY OF THE DISCLOSURE

The present disclosure provides embodiments of systems and methods for automatically mounting and dismounting a tire casing on an expandable rim hub employed in a retreading operation, such as, at a buffing station or at a skiving station, for example. Embodiments of systems and methods following principles of the present disclosure can help reduce operator time at a retreading station. Using such embodiments, an operator is able to pre-stage a number of tire casings for loading at the particular retreading station, begin the automated process, and move to another area to complete a different task. Dead time at the retreading station waiting to change out the tire casing after it has been processed can be reduced.

In one embodiment, a loader device for use with the mounting of a tire casing on an expandable rim hub is provided. The loader device includes a support pedestal, a support carriage movably mounted to the support pedestal, and a loader actuator mounted to at least one of the support pedestal and the support carriage.

The support pedestal is movable over a range of longitudinal travel along a longitudinal axis. The support carriage is movable over a range of vertical travel along a normal axis. The normal axis is perpendicular to the longitudinal axis. The support carriage has a support arm adapted to support a tire casing. The loader actuator is adapted to selectively move, relative to the support arm, at least a portion of a tire casing supported upon the support arm in a loading direction off of the support arm.

In another embodiment, a tire retreading system includes a tire hub assembly adapted to support and selectively rotate a tire casing about a rotational axis and a loader device arranged with respect to the tire hub assembly to selectively load a tire casing upon the tire hub assembly. The tire hub assembly has a tire chuck with an expandable rim hub adapted to selectively expand to retentively engage a tire casing mounted on the tire chuck. The expandable rim hub is movable between a contracted position and a range of expanded positions. The diameter of the expandable rim hub is greater in the expanded positions than in the contracted position.

The loader device includes a support pedestal, a support carriage movably mounted to the support pedestal, and a loader actuator mounted to at least one of the support pedestal and the support carriage. The support pedestal is movable over a range of longitudinal travel along a longitudinal axis. The support carriage is movable over a range of vertical travel along a normal axis. The normal axis is perpendicular to the longitudinal axis. The support carriage has a support arm adapted to support a tire casing. The loader actuator is adapted to selectively move, relative to the support arm, at least a portion of a tire casing supported upon the support arm in a loading direction off of the support arm onto the expandable rim hub.

In still another embodiment, a method of retreading a tire casing is described. The tire casing is moved toward a tire hub assembly. The tire casing is supported by a support arm of a loader device such that an upper portion of an inner periphery of the tire casing is disposed above an upper portion of an expandable rim hub of the tire hub assembly. The expandable rim hub is in a contracted position. The expandable rim hub has a rim diameter when in the contracted position that is smaller than an inner casing diameter defined by the inner periphery of the tire casing.

The tire casing is loaded onto the expandable rim hub of the tire hub assembly by using a loader actuator of the loader device to move at least a portion of the tire casing relative to the support arm such that said portion moves off of the support arm and into engagement with the expandable rim hub. The expandable rim hub is expanded such that the rim engages the inner periphery of the tire casing.

Further and alternative aspects and features of the disclosed principles will be appreciated from the following detailed descriptions and the accompanying drawings. As will be appreciated, the principles relating to systems and methods disclosed herein for mounting and dismounting a tire casing on an expandable rim hub in retreading operations are capable of being carried out in other and different embodiments, and are capable of being modified in various respects. Accordingly, it is to be understood that the foregoing general description and the following detailed description are exemplary and explanatory only and do not restrict the scope of the appended claims.

DETAILED DESCRIPTION OF EMBODIMENTS

Figure 1:
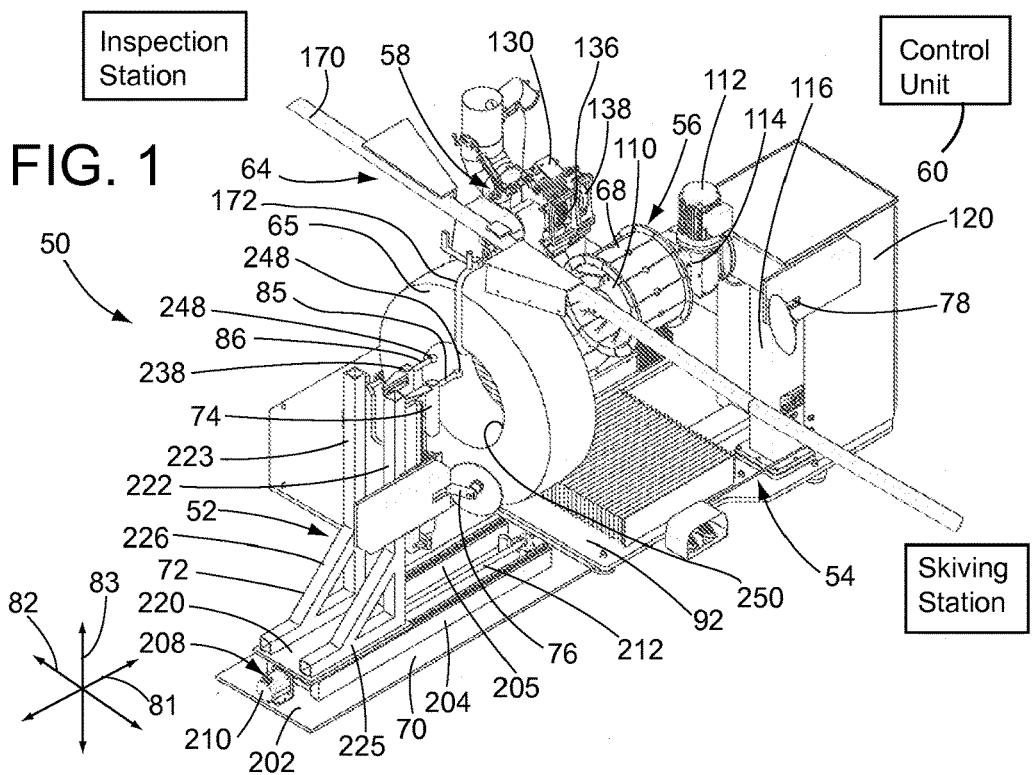
FIG. 1 is a perspective view of a tire buffing station having a loader device constructed in accordance with principles of the present disclosure for mounting and dismounting a tire casing on an expandable rim hub, the perspective view taken from a loader device side and illustrating the loader device in a home position disposed in offset relationship to a tire casing suspended from a tire casing conveyor.

The present disclosure is directed to embodiments of systems and methods for automatically mounting and dismounting a tire casing on an expandable rim hub in retreading operations. In embodiments, the expandable rim hub can be part of a tire hub assembly used at one or more retreading stations, such as at a buffing station and a skiving station, for example.

In embodiments, a tire retreading system according to principles of the present disclosure includes a tire hub assembly adapted to support and selectively rotate a tire casing about a rotational axis and a loader device arranged with respect to the tire hub assembly to selectively load a tire casing upon the tire hub assembly. The tire hub assembly has a tire chuck with an expandable rim hub adapted to selectively expand to retentively engage a tire casing mounted on the tire chuck. The expandable rim hub is movable between a contracted position and a range of expanded positions. The diameter of the expandable rim hub is greater in the expanded positions than in the contracted position.

The loader device includes a support pedestal, a support carriage movably mounted to the support pedestal, and a loader actuator mounted to at least one of the support pedestal and the support carriage. The support pedestal is movable over a range of longitudinal travel along a longitudinal axis. The support carriage is movable over a range of vertical travel along a normal axis, which is perpendicular to the longitudinal axis. The support carriage has a support arm adapted to support a tire casing. The loader actuator is adapted to selectively move, relative to the support arm, at least a portion of a tire casing supported upon the support arm in a loading direction off of the support arm onto the expandable rim hub.

In embodiments, a method of retreading a tire casing following principles of the present disclosure includes moving the tire casing toward a tire hub assembly. The tire casing is supported by a support arm of a loader device such that an upper portion of an inner periphery of the tire casing is disposed above an upper portion of an expandable rim hub of the tire hub assembly. The expandable rim hub is in a contracted position. The expandable rim hub has a rim diameter when in the contracted position that is smaller than an inner casing diameter defined by the inner periphery of the tire casing.

The tire casing is loaded onto the expandable rim hub of the tire hub assembly by rotating the expandable rim hub and using a loader actuator of the loader device to move the leading edge portion of the tire casing relative to the support arm such that said portion moves off of the support arm and into engagement with the rotating expandable rim hub. The loader actuator continues to extend as the casing is rotated, walking the casing onto the hub until the bead of the casing nearer to the actuator is pushed past the raised edge of the expandable rim hub. Both beads are now between the raised edges of the expandable rim hub segments. The loader actuator retracts. The expandable rim hub is expanded such that the rim engages the inner periphery of the tire casing now mounted around the rotating rim hub, and the tire is inflated.

Turning now to the FIGURES, there is shown in FIG. 1 an exemplary embodiment of a tire retreading station 50 constructed according to principles of the present disclosure. The illustrated tire retreading station 50 comprises a tire buffing station which includes a loader device 52, a buffing base assembly 54, a tire hub assembly 56, a rasp pedestal 58, and a control unit 60 (see FIG. 2). In the retreading system, a tire casing conveyor 64 can extend between at least two stations of a tire retreading operation. In the illustrated embodiment, the tire casing conveyor system is shown extending upstream from the tire buffing station 50 to an inspection station and downstream from the tire buffing station 50 to a skiving station.

The loader device 52 is adapted to mount and dismount a tire casing 65 on an expandable rim hub 68 of the tire hub assembly 56. In the illustrated embodiment, the loader device 52 is arranged with respect to the tire hub assembly 56 such that the loader device 52 can selectively load a tire casing 65 supported by the loader device onto the expandable rim hub 68 of the tire hub assembly 56 and selectively unload the tire casing 65 from the tire hub assembly 56 onto the loader device 52. The loader device 52 is electrically connected to the control unit 60, which is adapted to selectively control the operation of the loader device 52 to perform automated loading and unloading sequences for a plurality of tire casings. The loader device 52 includes a base 70, a support pedestal 72 movably mounted to the base 70, a support carriage 74 movably mounted to the support pedestal 72, a loader actuator 76 mounted to at least one of the support pedestal 72 and the support carriage 74, and a dismount actuator 78 mounted to at least one of the tire hub assembly 56, the support pedestal 72, and the support carriage 74.

Figure 2:
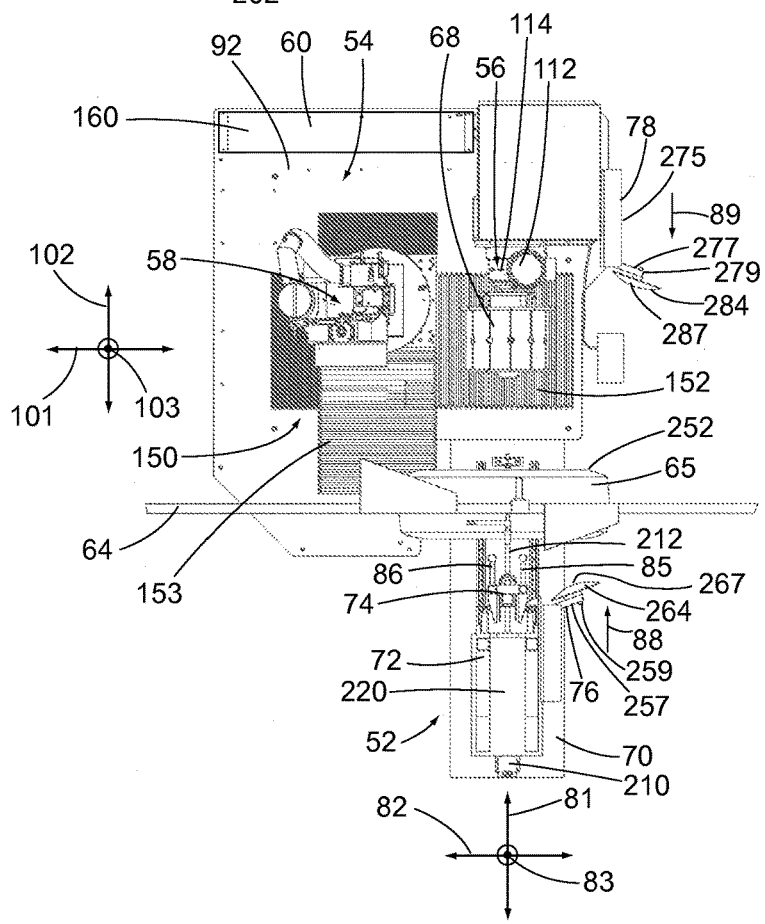
FIG. 2 is a top plan view of the tire buffing station of FIG. 1, also illustrating a control unit of the tire buffing station.
Figure 18:
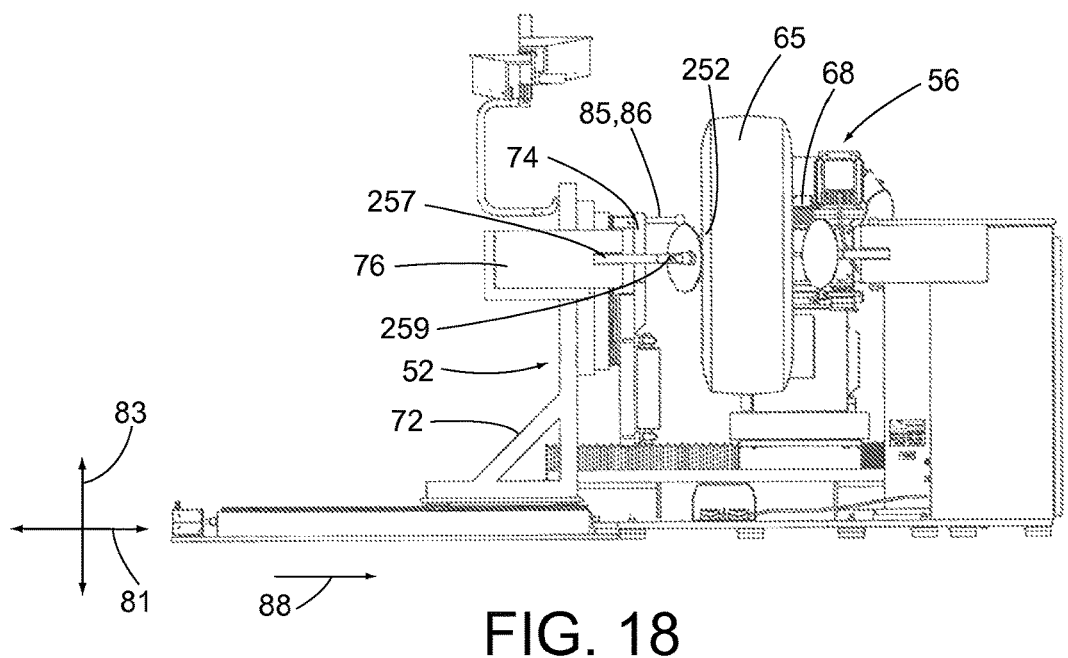

Referring to FIGS. 1 and 2, the support pedestal 72 is movable over a range of longitudinal travel along a longitudinal axis 81 between a home position, as shown in FIG. 1, and a terminal tire hub position, as shown in FIG. 18. The support pedestal 72 is adapted to move along the longitudinal axis 81 from the home position to a conveyor position (see FIG. 10) in which the tire casing 65 can be removed from the tire casing conveyor 64 to the terminal tire hub position in which the tire casing 65 can be loaded onto and unloaded from the tire hub assembly 56. Referring to FIGS. 1 and 2, the tire casing conveyor 64 is adapted to move the tire casing 65 into position by moving the tire casing 65 generally along a transverse axis 82, which is perpendicular to the longitudinal axis 81.

Figure 3:
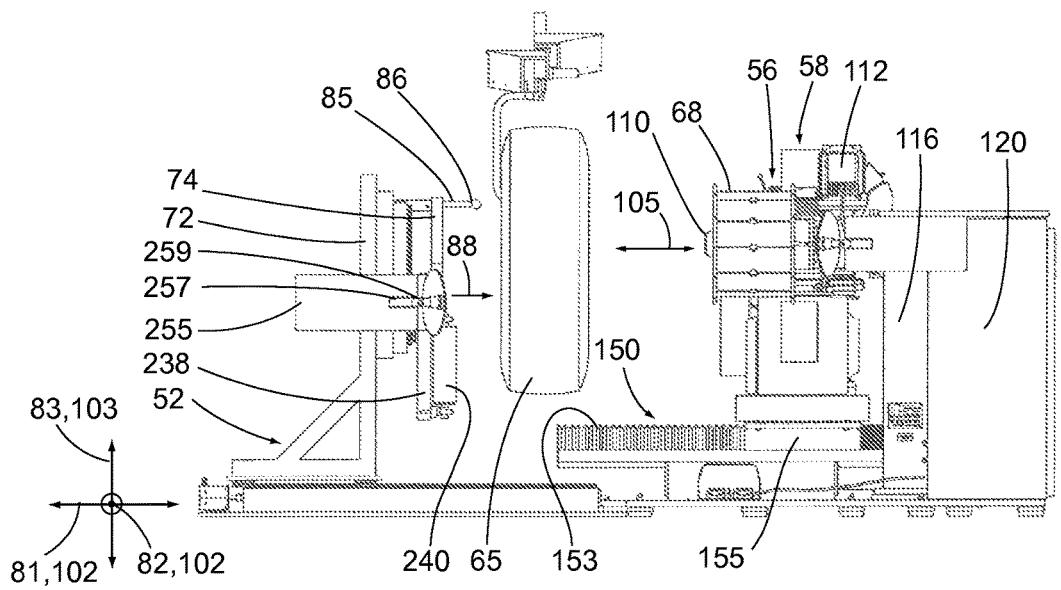
FIG. 3 is a downstream end elevation view of the tire buffing station of FIG. 1.
Figure 10:
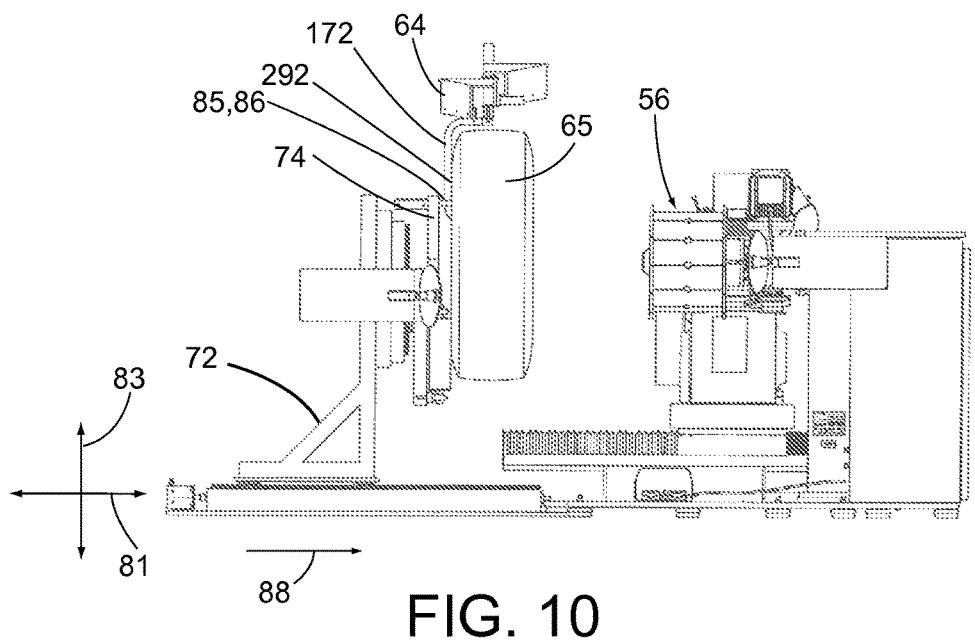
Figure 20:
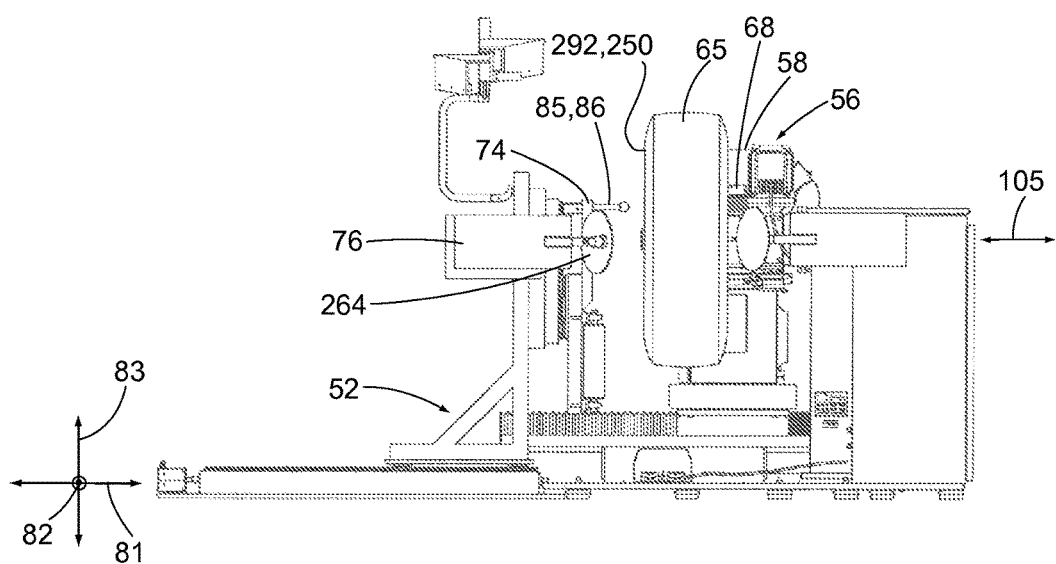

Referring to FIGS. 1 and 3, the support carriage 74 is movable over a range of vertical travel along a normal axis 83, which is mutually perpendicular to the horizontal longitudinal and transverse axes 81, 82, between a raised, loading position, as shown, e.g., in FIG. 10, and a lowered, unloading position, as shown, e.g., in FIG. 20. Referring to FIGS. 1 and 2, the support carriage 74 has a pair of support arms 85, 86 adapted to support the tire casing 65.

Figure 11:
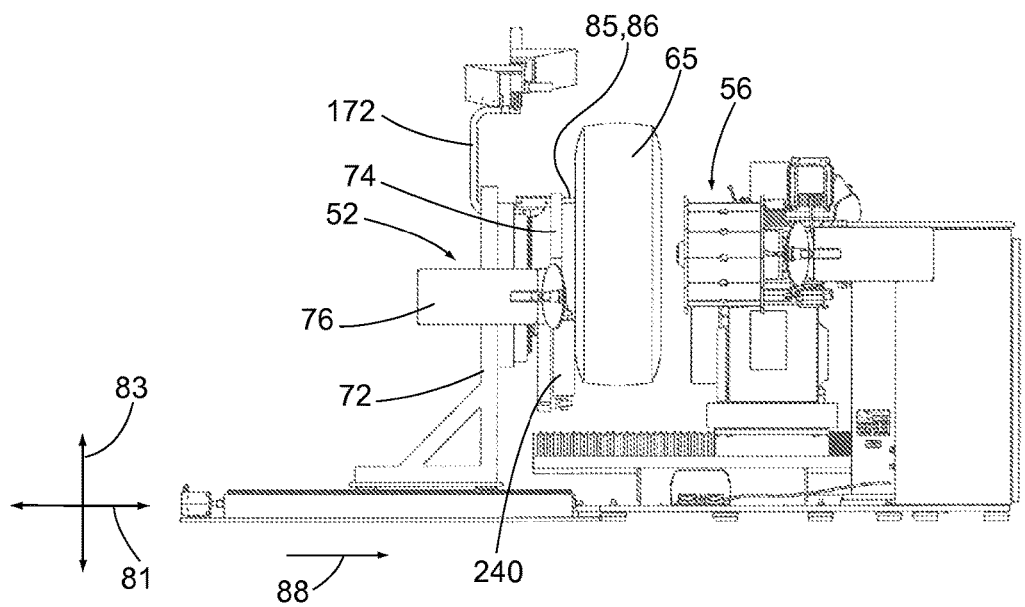
FIGS. 11 and 12 are a downstream end elevation view and a loader device side elevation view of the tire buffing station of FIG. 1 as in FIGS. 3 and 4, respectively, but, illustrating the loader device in a tire casing conveyor removal position, in which the tire casing is lifted off of a carrier hook of the tire casing conveyor.
Figure 14:
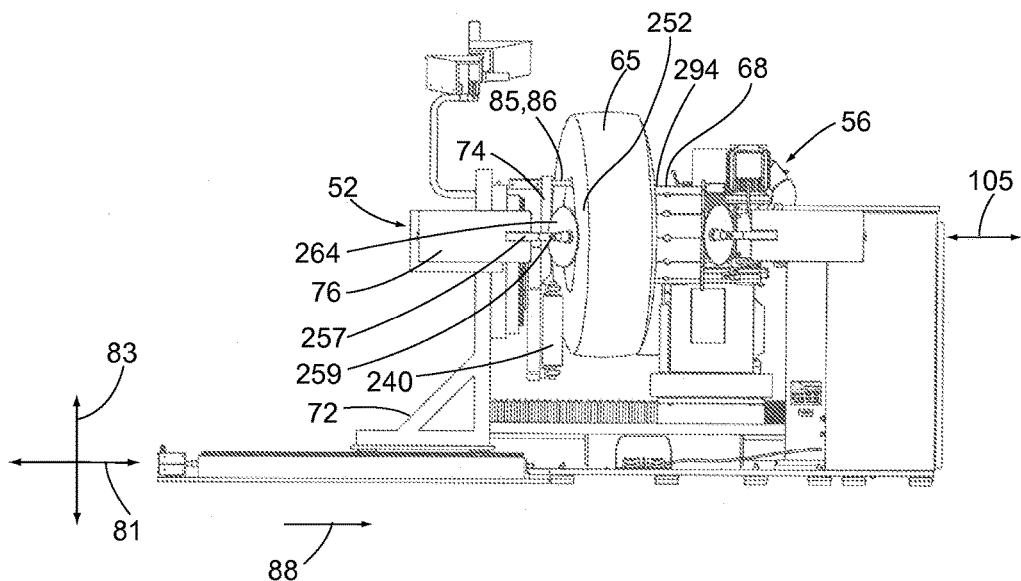

The illustrated loader actuator 76 is movably mounted to the support pedestal 72 such that the loader actuator 76 is movable over a range of travel along the normal axis 83 between the positions shown in FIGS. 11 and 14. Referring to FIG. 2, the loader actuator 76 is adapted to selectively move, relative to the support arms 85, 86, the tire casing supported upon the support arms 85, 86 in a loading direction 88 along the longitudinal axis 81 off of the support arms 85, 86 and onto the expandable rim hub 68 when the support pedestal 72 is in a loading position relative to the tire hub assembly along the longitudinal axis 81 (see, e.g., FIG. 14). The loader actuator includes a distal portion that is adapted to travel past the outermost raised edge of the expandable rim hub to ensure the beads of the casing are placed between the raised edges of the expandable rim hub segments during a tire casing mounting sequence.

Referring to FIG. 1, the illustrated dismount actuator 78 is mounted to the tire hub assembly 56. Referring to FIG. 2, the dismount actuator 78 is adapted to selectively move, relative to the support arms 85, 86 and rim hub 68, at least a portion of a tire casing supported upon the expandable rim hub 68 in an unloading direction 89 along the longitudinal axis 81 off of the expandable rim hub 68 when the rim hub 68 is contracted to a size that is less than an inner casing diameter defined by an inner periphery of the tire casing supported upon the expandable rim hub 68. The dismount actuator 78 can be adapted to move a tire casing loaded on the rim hub 68 back onto the support arms 85, 86 of the support carriage 74 when the support carriage 74 is in the lowered, unloading position along the normal axis 83 and the support pedestal 72 is in the terminal tire hub position along the longitudinal axis 81 (see, e.g., FIG. 22).

Referring to FIGS. 1 and 2, the buffing base assembly 54 can be adapted to support the other components and/or establish a particular spatial relationship between the components to facilitate the retreading processing occurring at the buffing station 50. The buffing base assembly 54 includes a bottom base plate 92 which acts to support other components of the tire buffing station 50.

Referring to FIG. 2, in the illustrated embodiment, the loader device 52 and the tire hub assembly 56 are mounted to the bottom base plate 92, and the rasp pedestal 58 is movably mounted to the bottom base plate 92. In the illustrated embodiment, the rasp pedestal 58 is independently movable over a range of travel along two horizontal perpendicular X- and Y-axes 101, 102. In addition the rasp pedestal 58 is rotatable with respect to the bottom base plate 92 about a vertical axis 103, which is mutually perpendicular to the horizontal X- and Y-axes 101, 102. The illustrated horizontal X- and Y-axes 101, 102 and the vertical axis 103 are substantially parallel with the transverse and longitudinal axes 82, 81 and the normal axis 83, respectively. In other embodiments, the movement of the rasp pedestal 58 can have a different relationship to the movement of the loader device 52.

Referring to FIGS. 1-3, the tire hub assembly 56 is adapted to support and selectively rotate a tire casing about a hub axis 105 (see FIG. 3). In the illustrated embodiment, the hub axis 105 is substantially parallel with the longitudinal axis 81. The tire hub assembly 56 can be located at a predetermined location with respect to the loader device 52 and the rasp pedestal 58 to facilitate the control of these components by the control unit 60. The tire hub assembly 56 is operably arranged with the loader device 52 such that the loader device 52 can load a tire casing onto the tire hub assembly 56 and unload a tire casing mounted on the tire hub assembly 56 back on to the loader device 52. The tire hub assembly 56 is operably arranged with the rasp pedestal 58 such that the rasp pedestal 58 can be moved into operable engagement with a tire casing mounted to the tire hub assembly 56 to perform a buffing sequence on the tire casing.

The tire hub assembly 56 has a tire chuck 110 for mounting a tire casing thereto. The expandable rim hub 68 is mounted to the tire chuck 110 and is adapted to selectively expand to retentively engage a tire casing mounted on the tire chuck 110 for accepting tire casings of variable sizes.

The expandable rim hub 68 is movable between a contracted position and a range of expanded positions to adjustably engage an inner periphery of tire casings of variable sizes. The diameter of the expandable rim hub 68 is greater in the expanded positions than in the contracted position.

The hub assembly 56 can include a tire drive motor 112 and a gear box 114 in operable arrangement with the tire drive motor 112 for rotating the tire chuck 110 about the hub axis 105. The hub assembly 56 is electrically connected to the control unit 60, which is adapted to selectively control the operation of the tire hub assembly 56 for buffing sequences and tire casing loading and unloading sequences. The control unit 60 is adapted to selectively operate the tire drive motor 112 to rotate a tire casing mounted to the expandable rim hub 68 about the hub axis 105.

Referring to FIG. 1, the hub assembly 56 can include a column assembly 116 which supports the gear box 114. The tire drive motor 112 and the tire chuck 110 each extend from the gear box 114. The expandable rim hub 68 circumscribes and is rotatively coupled with the tire chuck 110. The column assembly 116 can be mounted to the bottom base plate 92.

In embodiments, an inflation system for inflating a tire casing mounted to the tire chuck 110 can be provided. In embodiments, the tire hub assembly 56 includes a pneumatic enclosure 120, which can be mounted to the bottom base plate 92 and disposed adjacent the column assembly 116. The pneumatic enclosure 120 can be used to house a suitable pneumatic system for operating the inflation system and, in some embodiments, electro-pneumatically actuators and other pneumatic components, for example. The pneumatic system can be in electrical communication with the control unit 60, which is adapted to control its operation.

In addition to use in embodiments of a tire buffing station 50, it should be understood that embodiments of a loader device following principles of the present disclosure can be used to facilitate the loading and unloading of tire casings from a suitable tire hub assembly in other applications, as well. For example, in other embodiments, a loader device and tire hub assembly similar to those shown in FIG. 1 can be used to automatically load and unload tire casings onto the tire hub assembly for rotating a tire casing during another retreading operation, such as a skiving operation, for example.

Referring to FIGS. 1-4, the rasp pedestal 58 can be provided to selectively remove tire material from a tire casing mounted to the tire hub assembly 56 to provide a predetermined, buffed tire casing profile having a desired texture. The rasp pedestal 58 is adapted to be selectively movable relative to the tire hub assembly 56. The rasp pedestal 58 is electrically connected to the control unit 60, which is adapted to selectively control the operation of the rasp pedestal to perform a buffing sequence for a tire casing mounted to the tire hub assembly 56.

Figure 4:
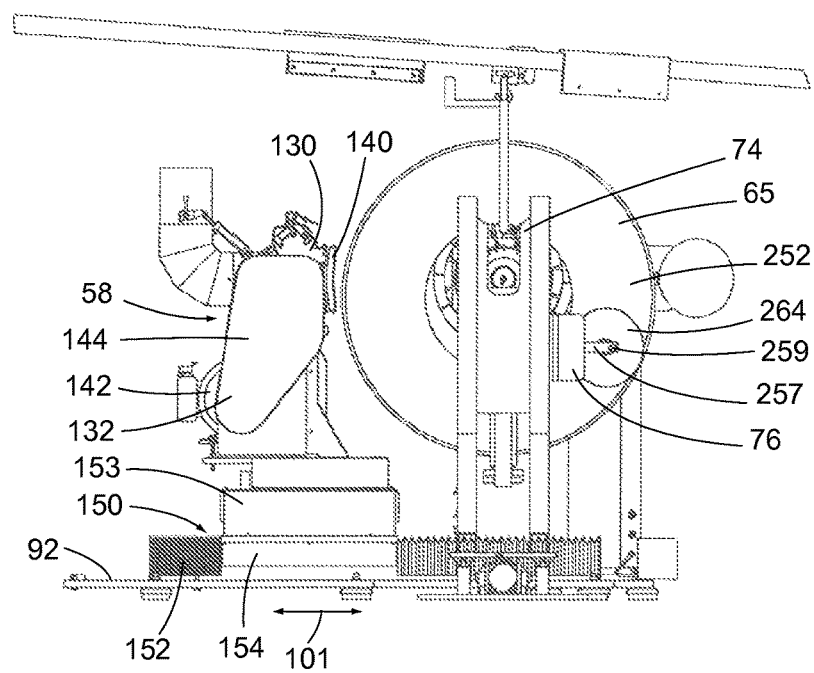
FIG. 4 is a loader device side elevation view of the tire buffing station of FIG. 1.

Referring to FIGS. 1 and 4, the rasp pedestal 58 can include a rasp head assembly 130 and a drive motor assembly 132. The rasp head assembly 130 can include a rasp head 136 for removing material from the tire casing to be buffed and a texturing device 138 for imparting a desired texture upon at least a portion of the tire casing. In embodiments, the texturing device 138 can be in the form of a wire brush. The rasp head 136 and the texturing device 138 can be mounted on a rotatable rasp shaft which is selectively driven by the drive motor assembly 132. The rasp head 136 and the texturing device 138 can be disposed within a housing 140 of the rasp head assembly 130 such that they are aligned with a respective opening therein to allow the rasp head 136 and the texturing device 138 to be selectively engageable with a tire casing mounted to the tire hub assembly 56. The rasp pedestal 58 is adapted to be selectively moved into engagement with a tire casing mounted to the tire hub assembly 56 such that the rasp head 136 of the rasp pedestal 58 contacts the tire casing to buff the tire casing to impart a predetermined tire casing profile.

The drive motor assembly 132 is adapted to selectively drive the rasp head assembly 130. The drive motor assembly 130 includes a suitable drive motor 142 operatively connected to the rasp head assembly 130 via a belt 144 which is in operative engagement with the rasp shaft. The drive motor 142 can be selectively operated by the control unit 60 to selectively rotate the rasp head 136 and the texturing device 138 during the buffing sequence. In embodiments, a suitable sensor can be associated with the drive motor 142 and the control unit 60 such that the sensor can send an operating parameter signal to the control unit 60 indicative of the value of the operating parameter, which information can be used by the control unit 60 to modify the operation of the rasp pedestal 58 during a buffing sequence to more closely follow a predetermined operation pattern.

Referring to FIGS. 2 and 3, in the illustrated embodiment, a rasp pedestal moving assembly 150 is provided to selectively move the rasp pedestal 58 with respect to the tire hub assembly 56. The moving assembly 150 can be mounted to the buffing base assembly 54 and connected to the rasp pedestal 58 for selectively moving the rasp pedestal 58 along the perpendicular horizontal X- and Y-axes 101, 102 and rotating the rasp pedestal 58 about the vertical axis 103. The rasp pedestal moving assembly 150 is electrically connected to the control unit 60, which is adapted to control the operation of the moving assembly 150 to move the rasp pedestal 58 during a buffing sequence. The moving assembly 150 is disposed between the bottom base plate 92 and the rasp pedestal 58. In embodiments, any suitable moving assembly 150 can be used to allow the rasp pedestal 58 to travel along a selected buffing path for a given type of tire casing.

The rasp pedestal moving assembly 150 can include a pair of X- and Y-runner members 152, 153 and a corresponding pair of X- and Y-tables 154, 155 which are reciprocally movable along the respective runner members 152, 153. These components are operably arranged to selectively and independently move the rasp pedestal along the X- and Y-axes 101, 102.

Referring to FIG. 4, the X-runner member 152 is secured to the bottom base plate 92. The X-table 154 is movably mounted to the X-runner member 152 such that the X-table 154 is reciprocally movable along the X-axis 101. The Y-runner member 153 is mounted to the X-table 154 such that the Y-runner member 153 moves along the X-axis 101 in conjunction with the movement of the X-table 154.

Referring to FIG. 3, the Y-table 155 is movably mounted to the Y-runner member 153 such that the Y-table 155 is movable along the Y-axis 102, which is perpendicular to the X-axis 101. The rasp pedestal 58 is rotatably mounted to the Y-table 155 such that the rasp pedestal 58 is rotatable about the vertical axis 103, which is mutually perpendicular to the X-axis 101 and the Y-axis 102.

The rasp pedestal moving assembly 150 can include suitable drive components which are adapted to selectively translate the X- and Y-tables 154, 155 along the X- and Y-axes 101, 102 and to rotate the rasp pedestal 58 about the vertical axis 103 with respect to the Y-table 155 to provide the rasp pedestal 58 with three degrees of movement. The rasp pedestal 58 is movable along the X- and Y-axes 101, 102 and rotatable about the vertical axis 103 to follow a predetermined buffing path which can vary depending on the make and size of the tire casing to be buffed.

In embodiments, a tire location mechanism can be mounted to the rasp pedestal for detecting a tire casing mounted to the tire hub assembly when the rasp pedestal is within a predetermined distance of the tire casing. A tire measurement mechanism can be mounted to the pedestal for measuring the size of the tire casing mounted to the hub assembly. In embodiments, the rasp pedestal can have any other suitable construction and/or features of rasp pedestals known to those skilled in the art. For example, in embodiments, the rasp pedestal can be similar in construction and operation to that shown and described in U.S. Pat. No. 6,745,809, entitled, "Tire Buffing Apparatus," which is incorporated herein by reference.

The rasp pedestal 58 can move along the predetermined the buffing path to define a predetermined tire casing profile. The control unit 60 can control the rasp pedestal 58 through the moving assembly 150 to move along a selected buffing path depending upon the type of tire casing to be buffed. In embodiments, the control unit 60 can be in operable arrangement with a database of buffing paths each associated with at least one type and/or size of tire casing. In embodiments, information sufficient to select a particular buffing path for a give tire casing can be input to the control unit 60 via any suitable technique. For example, in embodiments an operator station with a user interface can be provided to transmit appropriate information to the control unit 60 and to display operating information from the control unit 60 regarding the operation of the tire buffing station 50.

In other embodiments, a machine reader in operable, electrical communication with the control unit 60 can be positioned to read a suitable machine-readable tire casing identifier device (e.g., a RFID tag or a bar code label) associated with the tire casing, such as either as it is being loaded on to the tire hub assembly 56 or once it is mounted to the tire hub assembly 56. The machine reader can be adapted to transmit a tire casing identification data signal to the control unit 60 upon reading the machine-readable tire casing identifier device. The control unit 60 can execute computer-executable instructions stored on a tangible, computer-readable medium to use the tire casing identification data signal to select the buffing path for the particular tire casing from a database of buffing paths and to control the rasp head assembly 130 to move along the selected buffing path. In embodiments, the buffing path selected by the control unit 60 can be configured to operate and move rasp pedestal 58 to perform predetermined shoulder trimming with the rasp head 136 and/or a shoulder texturizing operation with the texturing device 138.

Referring to FIG. 2, the control unit 60 can be stored in an electrical enclosure 160 which is mounted to the bottom base plate 92. The electrical enclosure 120 can house the control unit 60 and other suitable electrical control components associated with the electrical system of the tire buffing station 50. In embodiments, the control unit 60 can be any suitable device or devices adapted to logically control the operation of the various components of the tire buffing station as described herein and as will be appreciated by one skilled in the art.

Referring to FIG. 1, the tire casing conveyor 64 can be adapted to selectively transport a plurality of tire casings in a logical sequence between associated retreading stations to sequentially process a tire casing at each retreading station to complete the retreading operation. The illustrated tire casing conveyor 64 includes an overhead monorail 170 supporting a plurality of moveably mounted carrier hooks 172 (see FIG. 5 also).

Figure 5:
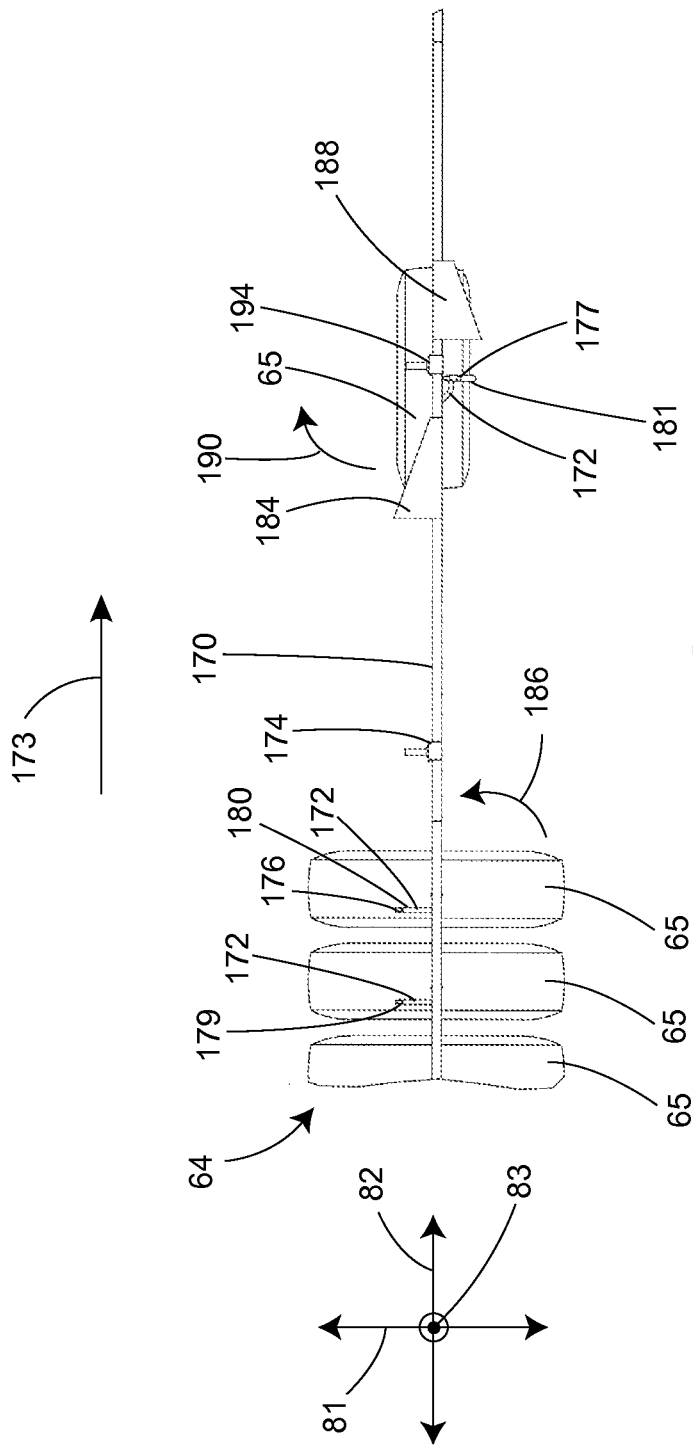
FIG. 5 is a fragmentary, top plan view of a tire casing conveyor of the tire buffing station of FIG. 1.

Referring to FIG. 5, each carrier hook 172 is adapted to support a tire casing 65 thereupon. The carrier hook 170 is slidably movable along the monorail 170, which is substantially parallel to the transverse axis 82, to move the tire casing 65 from one retreading station to another. The carrier hooks 172 can move along the transverse axis 82 using any suitable technique. In embodiments, the carrier hooks 172 are urged to move in a retreading machine direction 173 under the effects of gravity by virtue of the configuration of the overhead monorail 170 along selected portions thereof.

In embodiments, the tire casing conveyor 64 can include an upstream carrier hook stop 174 positioned at a predetermined location along the monorail 170. The upstream carrier hook stop 174 can be adapted to selectively prevent the downstream movement (i.e., along the retreading machine direction) of the carrier hooks that are upstream of the carrier hook stop 174 at the designated position to facilitate the automatic processing of the tire casing at a given retreading station. In embodiments, the upstream carrier hook stop 174 can include a stopping element reciprocally movable over a range of travel between a retracted position in which a carrier hook 172 can travel past the stop and an engagement position in which the upstream stop 174 is disposed to retentively engage the carrier hook 172 to prevent the carrier hook 172 from traveling further downstream to the location aligned with the loader device. The control unit 60 can be in electrical connection with the upstream carrier hook stop 174 and adapted to selectively operate the stop to sequentially feed tire casings 65 transported by the conveyor 64 to the loader device 52 for processing at the tire buffing station 50. In embodiments, a solenoid-operated actuator and a proximity sensor can be in electrical communication with the control unit 60 to selectively move the stop from the retracted position to the engagement position upon sensing the presence of a tire casing in a designated upstream range from the upstream stop 174. The upstream stop member 174 can be electro-pneumatically operated in other embodiments.

Between retreading stations, the conveyor 64 is adapted to transport the tire casings 65 such that the circumferential tread portion 67 of each tire casing 65 is substantially aligned with the longitudinal axis 81. Each carrier hook 172 is pivotally movable with respect to the monorail 170 to selectively rotate the supported tire casing 65 about the normal axis 83 such that the circumferential tread 67 of the tire casing is substantially aligned with the transverse axis 82 to facilitate the movement of the tire casing 65 into operative position at the retreading station.

In the illustrated embodiment, each carrier hook 172 includes a pair of guide pins 176, 177 in offset, spaced relationship to each other along a generally L-shaped member 179 of the carrier hook 172 such that a guide pin 176, 177 projects upwardly from a respective leg 180, 181 of the L-shaped member 179. An upstream guide channel 184 is mounted to the monorail 170 at a position slightly upstream of the particular retreading station, in this case, the tire buffing station 50. The upstream guide channel 184 is configured to engage one of the upright guide pins 176 on the carrier hook 172 to rotate the carrier hook 172 (and the tire casing 65 it supports) about the normal axis 83 in a first hook rotating direction 186 such that the circumferential tread surface 67 of the tire casing 65 becomes substantially aligned with the monorail 170 along the transverse axis 82 (see FIGS. 6 and 7 also).

A downstream guide channel 188 can be disposed a distance downstream of the retreading station and adapted to return the carrier hook to its original position as shown upstream of the upstream guide channel 184. In the illustrated embodiment, the downstream guide channel 188 is configured to engage the other upright pin 177 of the carrier hook to rotate the carrier hook 172 (and the tire casing 65 it supports) about the normal axis 83 in a second hook rotating direction 190, which is in opposing relationship to the first hook rotating direction 186, to a position wherein the circumferential tread surface 67 of the tire casing 65 is substantially perpendicular to the line of movement of the monorail 170, namely substantially aligned with the longitudinal axis 81.

Figure 6:
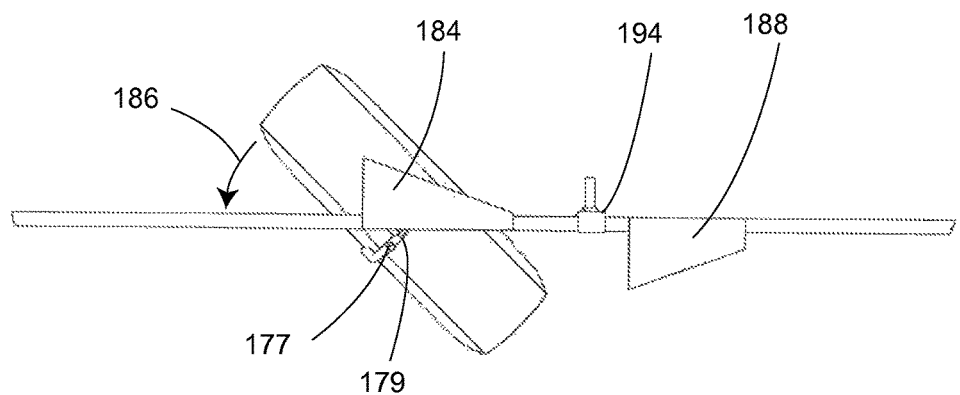
FIG. 6 is a fragmentary, detail top plan view of the tire casing conveyor of FIG. 5, illustrating a carrier hook of the tire casing conveyor system undergoing a turning sequence.
Figure 7:
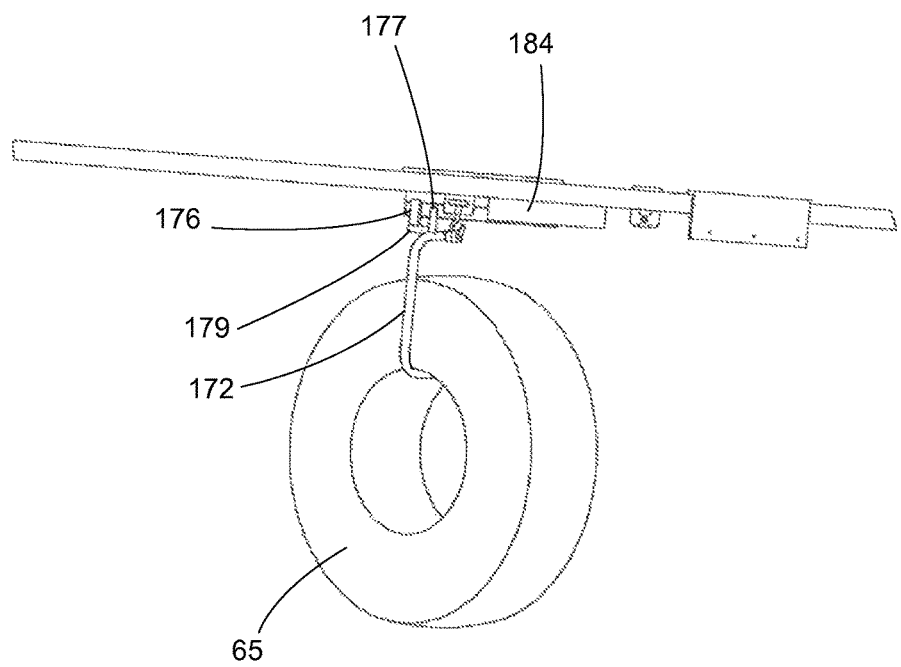
FIG. 7 is a fragmentary, detail loader device side elevation view of the tire casing conveyor of FIG. 5, illustrating the carrier hook as in FIG. 6.

A station hook stop 194 can be located between the upstream guide channel 184 and the downstream guide channel 188 (see FIG. 6 also). The station hook stop 194 can be configured to stop the carrier hook 172 disposed between the upstream guide channel 184 and the downstream guide channel 188 in a station position, as shown in FIG. 5, wherein the tire casing 65 carried by the carrier hook 172 is positioned to be picked up by the loader device 52 for loading onto the tire hub assembly 56 and returned to the carrier hook 172 after being processed in an unloading sequence. The station hook stop 194 can provide a repeatable stopping point for each tire casing transported by the conveyor 64 from which the loader device 52 can retrieve it and load it upon the tire hub assembly 56.

Referring to FIG. 1, the loader device 52 is adapted to remove the tire casing 65 in the station position along the monorail 170 from the carrier hook 172 and mount it on the expandable rim 68 of the tire hub assembly 56. The loader device 52 is arranged with respect to the tire hub assembly 56 and is adapted to selectively load the tire casing 65 supported by the loader device 52 onto the expandable rim hub 68 of the tire hub assembly 56 and to selectively unload the tire casing 65 from the tire hub assembly 56 onto the loader device 52. The loader device 52 is electrically connected to the control unit 60, which is adapted to selectively control the operation of the loader device 52 to perform loading and unloading sequences.

The loader base 70 is adapted to support the other components of the loader device 52. The loader base 70 is connected to the bottom base plate 92. In embodiments, the loader base 70 can be an integral part of the bottom base plate 92.

Referring to FIG. 1, the illustrated loader base 70 includes a support plate 202, a pair of slide rails 204, 205 mounted to the support plate, and a moving assembly 208 also mounted to the support plate 202. The slide rails 204, 205 are disposed in parallel, spaced relationship to each other and extend substantially along and parallel with the longitudinal axis 81. The moving assembly 208 is adapted to selectively move the support pedestal 72 relative to the slide rails 204, 205.

In embodiments, the moving assembly 208 can include a servo motor 210 and a ball screw 212 arranged to selectively move the support pedestal 72 along the slide rails 204, 205. The servo motor 210 can be in electrical communication with the control unit 60 which is adapted to selectively operate the servo motor 210 to reciprocally move the support pedestal 72 along the slide rails 204, 205 to selectively perform a tire casing loading sequence and/or a tire casing unloading sequence. In embodiments, a suitable position sensor arrangement can be provided which is in electrical communication with the control unit 60 to provide a pedestal position signal indicative of the position of the support pedestal 72 along the slide rails 204, 205 to facilitate the precise movement of the support pedestal 72 during loading and unloading sequences.

The support pedestal 72 is movably mounted to the base 70 via the slide rails 204, 205 such that the support pedestal 72 is movable over a range of longitudinal travel along the longitudinal axis 81. The support pedestal includes a mounting plate 220 and a pair of upright support members 222, 223 in spaced relationship to each other. Each support member 222, 223 has a brace structure 225, 226 associated therewith, extending between the uprights 222, 223 and the mounting plate 220. In embodiments, the support pedestal 72 can include additional or other cross-bracing structures to increase the rigidity of the uprights 222, 223.

Figure 8:
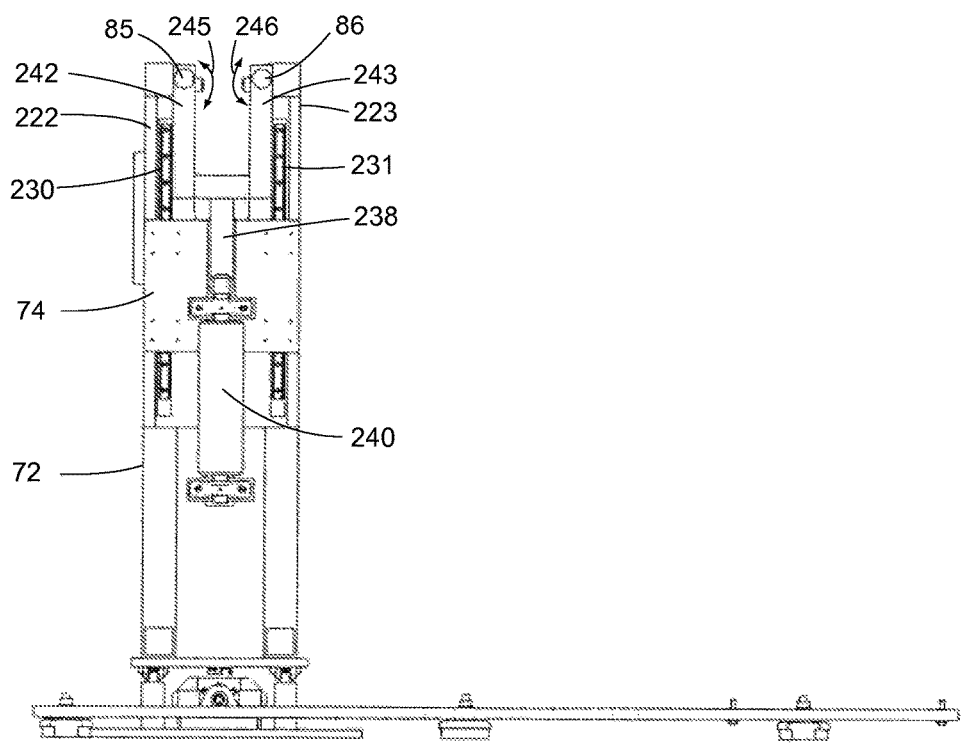
FIG. 8 is a tire buffer side elevation view of the loader device of FIG. 1.

Referring to FIG. 2, the mounting plate 220 can be connected to the ball screw 212 of the base 70 such that operation of the servo motor 210 in a first direction moves the support pedestal 72 in the loading direction 88 along the longitudinal axis 81 and operation of the motor 210 in a second, opposing direction moves the support pedestal 72 in the unloading direction 89 along the longitudinal axis 81, which is in opposing relationship to the loading direction 88. Referring to FIG. 8, each of the uprights 222, 223 of the support pedestal 72 includes a slide rail 230, 231 attached thereto which are adapted to movably retain the support carriage 74.

Referring to FIG. 3, the support carriage 74 is movably mounted to the support pedestal 72 such that the support carriage 74 is movable over a range of vertical travel along the normal axis 83 with respect to the support pedestal 72. In embodiments, the support carriage 74 has at least one support arm 85 adapted to support the tire casing 65.

Referring to FIG. 8, the illustrated support carriage 74 includes a frame 238, a pair of support arms 85, 86 mounted to the frame 238, and a roller 240 journaled for rotation on the frame 238.

The illustrated frame 238 has a pair of upper distal legs 242, 243 in spaced relationship to each other, thereby providing a generally Y-shape. Each distal leg 242, 243 of the frame 238 supports one of the support arms 234, 235, respectively. The illustrated support arms 85, 86 are rotatably mounted to the frame 238 such that the support arms 234, 235 are rotatable about their longitudinal shaft in either direction, as indicated by rotational arrows 245, 246 in FIG. 8.

The frame 238 of the support carriage 74 can be retentively engaged with the slide rails 230, 231 connected to the uprights 222, 223 of the support pedestal 72 such that the support carriage 74 is reciprocally movable over a range of vertical travel along the normal axis 83. A support carriage moving assembly similar to the support pedestal moving assembly 208 can be provided to selectively move the support carriage 74 over the range of vertical travel along the normal axis 83. In embodiments, the support carriage moving assembly can include a servo motor with an associated ball screw mechanism. The frame 238 of the support carriage 74 can be mounted to the ball screw, and the servo motor can be mounted to the support pedestal 72. The motor can be operated in first and second directions to respectively raise and lower the support carriage 74 along the normal axis 83 relative to the uprights 222, 223 of the support pedestal 72. In embodiments, a suitable position sensor arrangement can be provided which is in electrical communication with the control unit 60 to provide a support carriage position signal indicative of the vertical position of the support carriage 74 along the slide rails 230, 231 to facilitate the precise movement of the support carriage 74 during loading and unloading sequences.

The illustrated frame 238 of the support carriage 74 is configured such that a carrier hook 172 disposed in the station position on the monorail 170 is allowed to pass between the pair of upper distal legs 242, 243 of the frame 238. The uprights 222, 223 of the support pedestal 72 are similarly configured to allow the carrier hook 172 disposed at the station position to pass between the uprights 222, 223 of the support pedestal 72, thereby allowing the support pedestal 72 to move along the longitudinal axis 81 from a home position to a loading position without interferingly engaging the carrier hook 172 disposed at the station position.

Referring to FIG. 1, the support arms 85, 86 are in spaced relationship to each other and extend from the frame 238 along the longitudinal axis 81. The support arms 85, 86 are rotatably mounted to the frame 238 such that the support arms 85, 86 are rotatable about a respective axis that is substantially parallel to the longitudinal axis 81. The support arms 85, 86 can be rotatably mounted to the frame 238 to facilitate the mounting and dismounting of the tire casing 65 upon the rotating rim hub during the loading and unloading sequences as explained further below.

In embodiments, at least one of the support arms 85, 86 has a generally-spherical distal end 248. In the illustrated embodiment, each support arm 85, 86 of the support carriage includes a generally-spherical distal end 248. The distal ends 248 can be configured to help retentively engage an inner periphery 250 of the tire casing 65 mounted to the support arms 85, 86. The illustrated distal ends 248 project radially outwardly from the generally cylindrical shafts of the support arms 85, 86.

Referring to FIG. 3, the illustrated roller 240 of the support carriage 74 is journaled on the frame 238 for rotation generally about the normal axis 83. The roller 240 is disposed in spaced relationship to the support arms 85, 86 along the normal axis 83. The roller 240 of the support carriage 74 can be configured to provide additional stability to a tire casing 65 supported by the support arms 85, 86 of the support carriage 74. The roller 240 can be configured to rotate about the normal axis 83 to facilitate the loading and unloading of the tire casing 65 upon a rotating rim hub 68.

Referring to FIG. 3, the loader actuator 76 is adapted to selectively move at least a portion of a tire casing supported upon the support carriage 74 in the loading direction 88 along the longitudinal axis 81 off of the support arms 85, 86 and onto the expandable rim hub 56 when the support pedestal 72 is in proximate relationship to the tire hub assembly 56. The illustrated loader actuator 76 is vertically movably mounted with respect to the support pedestal 72. Referring to FIG. 4, the loader actuator 76 can be mounted such that the loader actuator 76 is selectively engageable with a leading edge portion 252 of the tire casing 65 when it is supported by the support carriage 74.

Referring to FIG. 4, the illustrated loader actuator 74 comprises a cylinder actuator having a body 255 and a reciprocally movable piston 257. The piston 257 is housed within the body 255 such that a distal end 259 of the piston 257 extends from the body 255. The piston 257 is reciprocally movable with respect to the body 255 over a range of travel between a retracted position (see FIG. 3) and an extended position (see FIG. 16). The piston 257 includes a piston head disposed within the body 255 and a rod which includes the distal end 259 extending from the body 255. The rod of the loader actuator 76 includes the distal end 259 of the piston 257 which is operably arranged with a tire casing borne by the support arms 85, 86 of the support carriage 74 such that moving the piston 257 of the loader actuator 76 to the extended position moves at least the leading edge portion 252 of the supported tire casing 65 relative to the support arms 85, 86 along the longitudinal axis 81.

Referring to FIGS. 2 and 4, the illustrated loader actuator 76 includes a tire casing engagement member 264 rotatably mounted to the distal end 259 of the piston 257. The tire casing engagement member 264 is rotatable about its attachment point to the distal end 259 of the piston 257. The illustrated engagement member 264 is a generally dish-shaped section of a sphere with an exterior convex surface 267 in proximate relationship to a tire casing supported by the support arms 85, 86 of the support carriage 74. The exterior convex surface 267 is configured to facilitate the rotation of the engagement member 264 in response to the rotation of the tire casing as it is being mounted upon the rotating rim hub 68.

Referring to FIG. 2, the dismount actuator 78 is adapted to selectively move at least a portion of a tire casing supported upon the expandable rim hub 68 in the unloading direction 89 along the longitudinal axis 81 off of the expandable rim hub 68 to initiate the unloading sequence back on to the support arms 85, 86 of the loader device 52. The loader actuator 78 can be mounted such that the loader actuator 78 is selectively engageable with a leading edge portion 252 of a tire casing mounted to the rim hub 68 of the tire hub assembly 56. The illustrated dismount actuator 78 is mounted to the tire hub assembly 56. In other embodiments, other mounting arrangements can be used.

Figure 25:
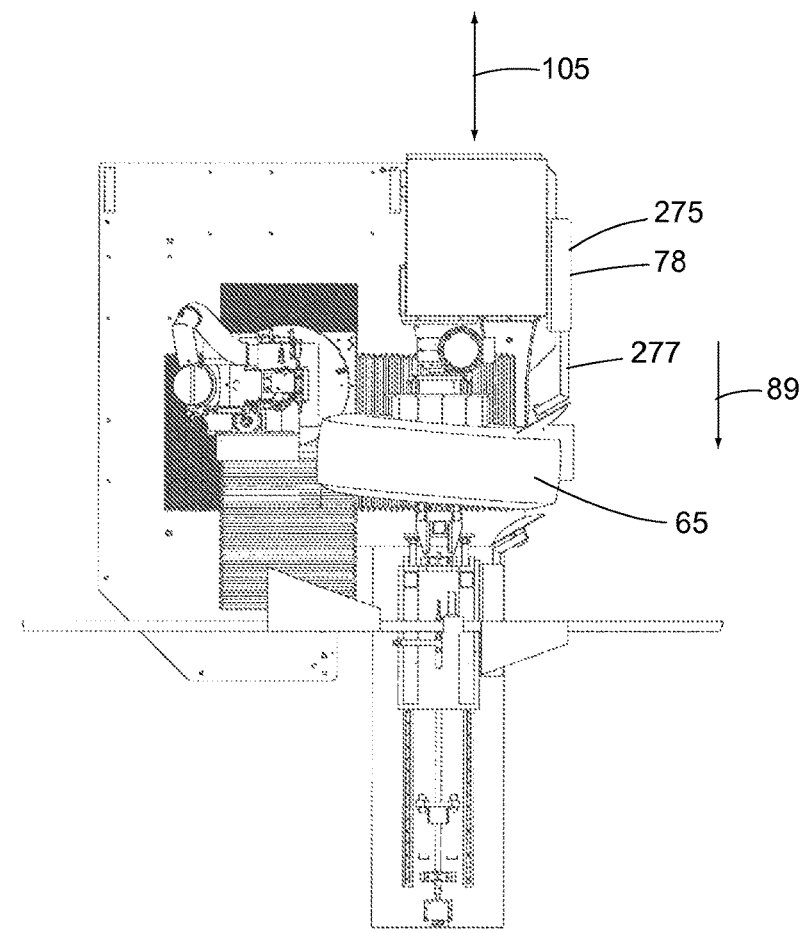

The illustrated dismount actuator 78 comprises a cylinder actuator having a body 275 and a reciprocally movable piston 277. The piston 277 includes a piston head disposed within the body and a rod having at least a distal end portion 279 extending from the body 275. The piston 277 is reciprocally movable with respect to the body 275 over a range of travel between a retracted position (FIG. 2) and an extended position (FIG. 25). The distal end 279 of the piston rod supports an engagement member 284 which is rotatably mounted thereto. The illustrated engagement member 284 of the dismount actuator 78 has an exterior convex surface 287 that is configured in a similar manner as the engagement member 264 of the loader actuator 76. The illustrated engagement member 284 of the dismount actuator 78 is configured to facilitate the rotation of the engagement member 284 in response to the rotation of the tire casing as it is being unloaded from the rotating rim hub 68 back on to the loader device 72 during an unloading sequence.

In embodiments, the tire buffing station 50 can include an operator interface situated such that an operator located at the operator interface is positioned to allow for convenient observation of the rasp pedestal 112, the hub assembly 116, and the loader device. The operator interface can include a suitable display and interface mechanism, such as a touch screen for example, operably connected to the control unit 60 to transmit, receive and display information concerning the characteristics and parameters related to the tire casing to be buffed and operating parameters and characteristics of the rasp, for example. The operator interface can include a power switch and an emergency-stop switch. In embodiments, an operator interface in the form of a touch screen, for example, can act as an interface between the user and the control unit 60 housed in the electrical enclosure 160 for controlling the operation of the tire buffing station 50.

Figure 9:
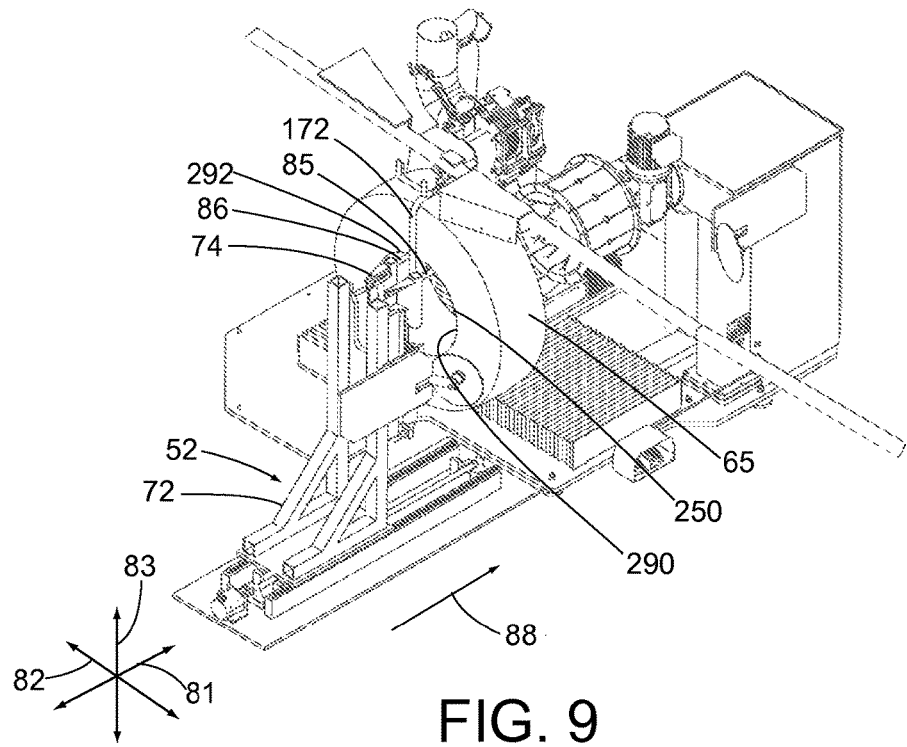
FIGS. 9 and 10 are a perspective view and a downstream end elevation view of the tire buffing station of FIG. 1 as in FIGS. 1 and 3, respectively, but illustrating the loader device in a tire casing conveyor position, in which the loader device is in proximate relationship to the tire casing conveyor.

FIGS. 9-18 illustrate a loading sequence for one embodiment of a method of retreading a tire casing. Referring to FIGS. 9 and 10, the support pedestal 72 of the loader device 52 has moved in the loading direction 88 from the home position, as shown in FIG. 1, to a conveyor position along the longitudinal axis 81. The support carriage 74 has moved upwardly along the normal axis 83 from a tire casing position, as shown in FIG. 3, to a raised, tire casing loading position. The support carriage 74 can be positioned vertically in the tire casing position along the normal axis 83 when the support pedestal 72 is moved into the conveyor position such that the support arms 85, 86 extend through an opening 290 defined by the inner periphery 250 of the tire casing 65 and are disposed adjacent an upper portion 292 of the inner periphery 250. With the support pedestal 72 in the conveyor position, the support carriage 74 can then move upwardly along the normal axis 83 to the raised position such that the tire casing 65 is removed from the carrier hook 172 of the tire casing conveyor 64 disposed at the station position by using the support arms 85, 86 to lift the tire 65 off of the carrier hook 172.

Referring to FIG. 11, the tire casing 65 is removed from the carrier hook 172 and has moved in the loading direction 88 toward the tire hub assembly 56 along the longitudinal axis 81 with the support pedestal 72 of the loader device 52 being in an intermediate position closer to the tire hub assembly 56 relative to the home position. The tire casing 65 is supported by the support arms 85, 86 and the roller 240 of the support carriage 74.

Figure 12:
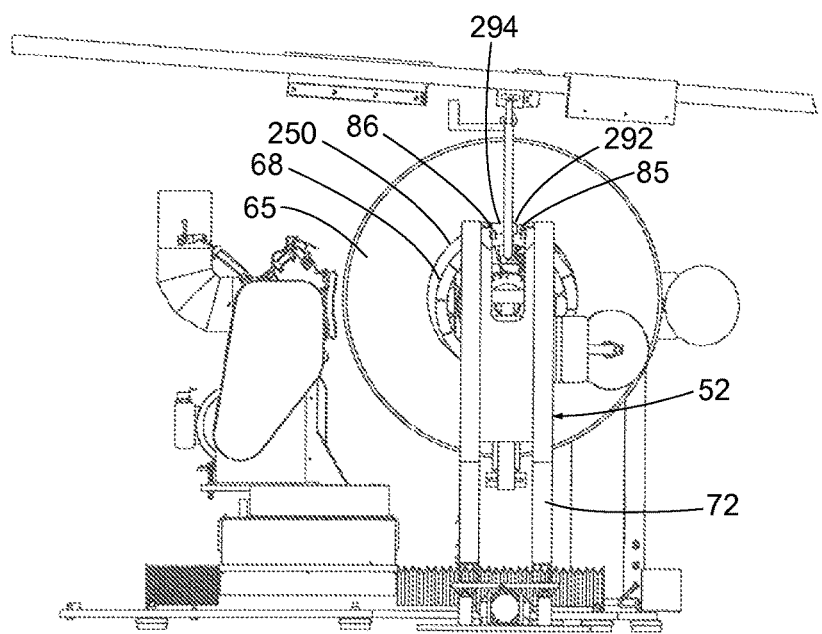

Referring to FIG. 12, the expandable rim hub 68 is in a contracted position. The expandable rim hub 68 has a rim diameter when in the contracted position that is smaller than an inner casing diameter defined by the inner periphery 250 of the tire casing 65. The tire casing 65 is supported by the support arms 85, 86 of the loader device 52 such that the upper portion 292 of the inner periphery 250 of the tire casing 65 is disposed above an upper portion 294 of the expandable rim hub 68 of the tire hub assembly 56. In embodiments, the support arms 85, 86 can be disposed above the upper portion 292 of the contracted rim hub 68 of the tire hub assembly 56 when the support carriage 74 is in the raised, tire casing loading position to facilitate the loading sequence.

Figure 13:
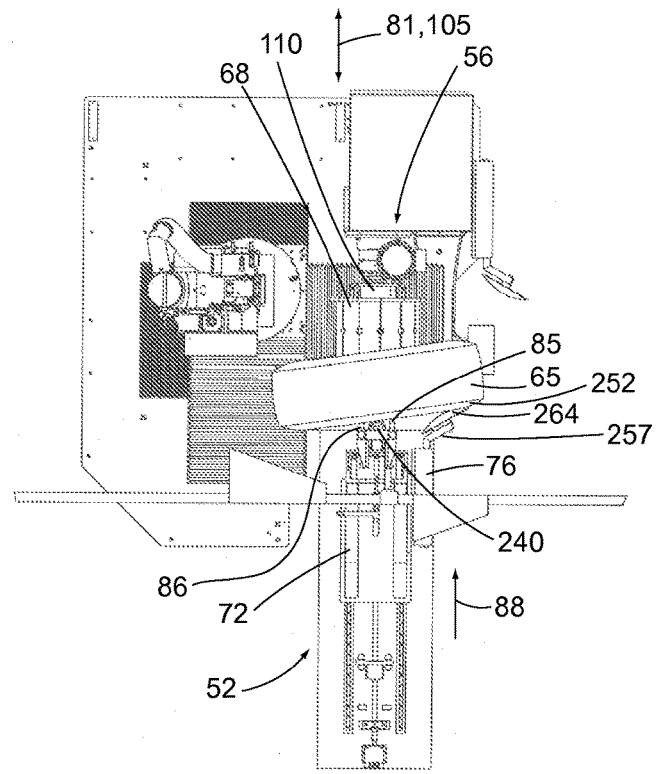
FIGS. 13-18 are three pairs of top plan and downstream end elevation views of the tire buffing station of FIG. 1 as in FIGS. 2 and 3, but illustrating the loader device in a tire buffer position, in which the loader device is in proximate relationship to a tire hub assembly which includes the expandable rim hub, and depicting the loader device sequentially performing a loading operation, in which the tire casing supported by the loader device is automatically moved onto the rotating expandable rim hub.

Referring to FIGS. 13 and 14, the support pedestal 72 of the loader device 52 has moved in the loading direction 88 from the intermediate position, as shown in FIGS. 11 and 12, to a first tire hub loading position along the longitudinal axis 81. The loader actuator 76 has been moved vertically along the normal axis 83 from a home position, as shown in FIG. 11, to an unloading position, as shown in FIG. 14. The tire casing 65 can be loaded onto the expandable rim hub 68 of the tire hub assembly 56 by using the loader actuator 76 of the loader device 52 to move at least a portion of the tire casing 65 relative to the support arms 85, 86 along the hub axis 105 of the tire hub assembly 56 so that portion moves into engagement with the rotating expandable rim hub 68. By positioning the support arms 85, 86 above the upper portion 294 of the rotating rim hub 68, the portion of the tire casing 65 that moves off of the support arms 85, 86 can move downwardly, by the effects of gravity, onto the rim hub 68.

In embodiments, to facilitate the loading of the tire casing 65 onto the tire chuck 110, the expandable rim hub 68 and tire chuck 110 are rotated about the hub axis 105. The longitudinal axis 81 is substantially parallel to the casing rotation or hub axis 105 defined by the rotatable tire chuck 110 of the tire hub assembly 56. The tire casing engagement member 264 of the loader actuator 76 and the roller 240 of the support carriage 74 can rotate in response to the rotation of the tire casing 65 to further facilitate the engaging support of the tire casing 65 as it moves onto the rotating tire chuck 110 of the tire hub assembly 56.

In the illustrated loading sequence, the tire casing 65 is loaded onto the expandable rim hub 68 by moving a leading edge portion 252 of the tire casing 65 relative to the support arms 85, 86 such that the leading edge 252 of the tire casing 65 engages the rotating rim hub 68. The piston 257 of the loader actuator 76 is operably arranged with the tire casing 65 borne by the support carriage 74 such that moving the piston 257 of the loader actuator 76 moves at least a portion of the tire casing 65 into overlying relationship with the rim hub 68. As shown in FIG. 14, the piston 257 of the loader actuator 76 has moved to an intermediate position such that the distal end 259 of the loader actuator 76 is in engaging contact with the tire casing 65 and has moved the leading edge 252 of the tire casing 65 relative to the support arms 85, 86.

Figure 15:
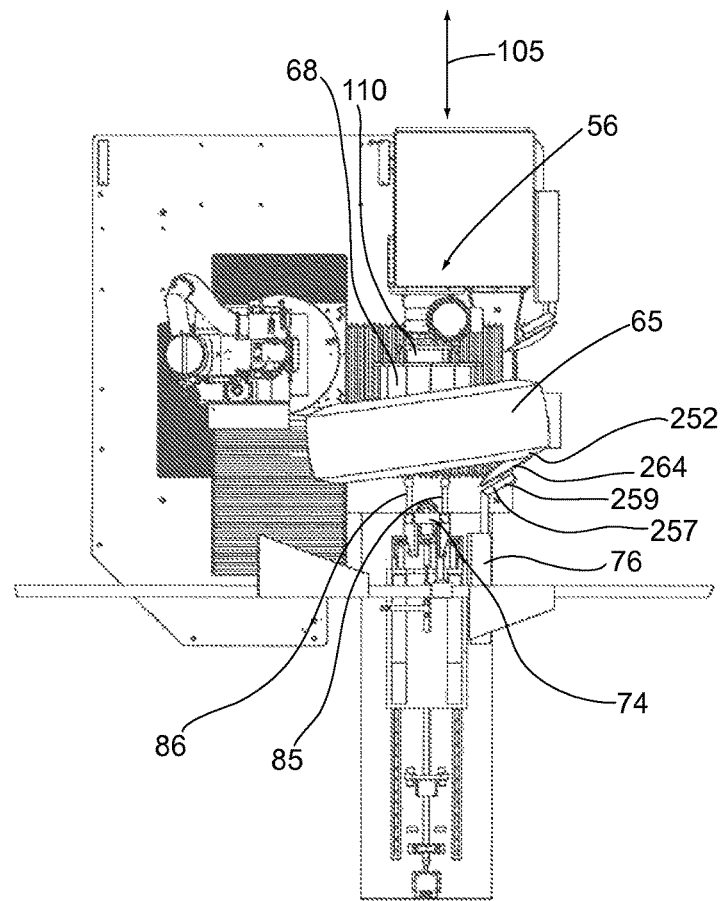
Figure 16:
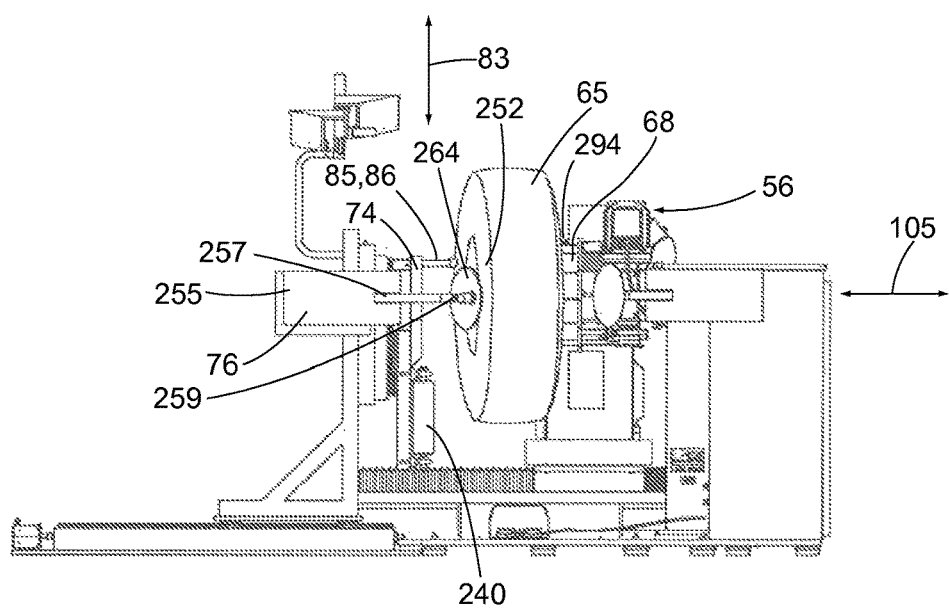

Referring to FIGS. 15 and 16, the piston 257 of the loader actuator 76 has moved to an extended position such that the distal end 259 of the loader actuator 76 is in engaging contact with the tire casing 65 and has moved the leading edge 252 of the tire casing 65 relative to the support arms 85, 86 even further onto the rotating tire chuck 110. The turning rim hub 68 rotatively moves the leading edge 252 of the tire casing 65 such that a remainder portion of the tire casing 65 is moved off of the support arms 85, 86 and onto the rotating rim hub 68. The tire casing engagement member 264 of the loader actuator 76 continues to rotate in response to the rotation of the tire casing 65 to further facilitate the engaging contact of the loader actuator 76 with the rotating tire casing 65 as it translates along the hub axis 105 onto the rotating tire chuck 110 of the tire hub assembly 56.

Referring to FIG. 16, the support carriage 74 can be moved downwardly along the normal axis 83 to a lowered, unloading position which is lower than the tire casing position. The roller 240 of the support carriage 74 is in spaced relationship with the tire casing 65. When the support carriage 74 is in the unloading position, the support arms 85, 86 are below the upper portion 294 of the rotating rim hub 68 to facilitate the unloading sequence.

Figure 17:
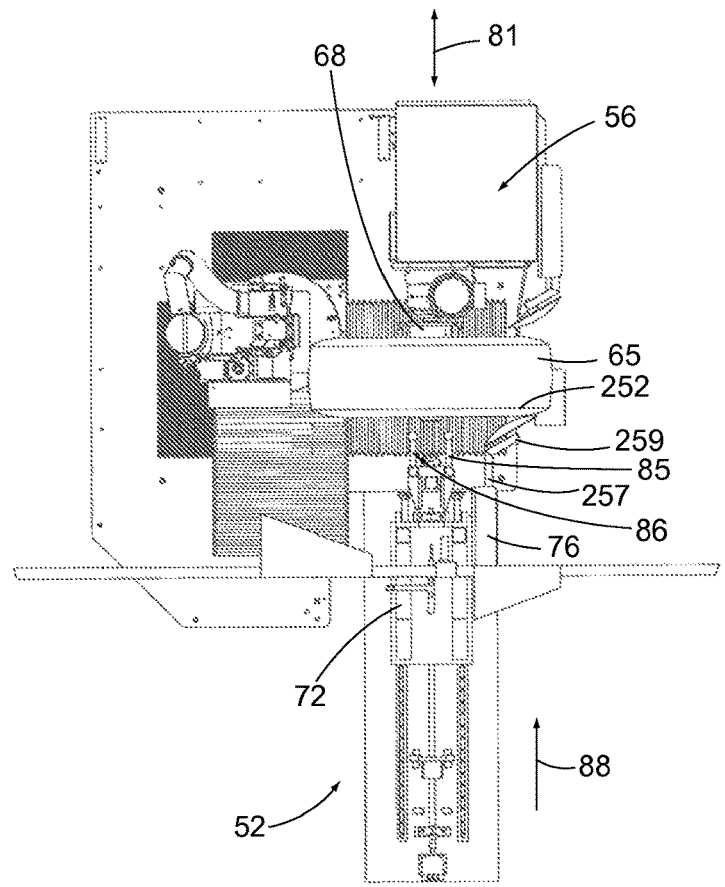

Referring to FIGS. 17 and 18, the support pedestal 72 of the loader device 52 has moved in the loading direction 88 from the first tire hub loading position, as shown in FIGS. 13 and 14, to the terminal tire hub position along the longitudinal axis 81. The terminal tire hub position is closer to the tire hub assembly 56 than the first tire hub loading position. The piston 257 of the loader actuator 76 is in an extended position such that the distal end 259 of the loader actuator 76 is in engaging contact with the tire casing 65 and has moved the leading edge 252 of the tire casing 65 fully onto the rotating rim hub 68. The rotating rim hub 68 and the leading edge portion 252 of the tire casing 65 become interengaged such that the continued rotation of the rim hub 68 causes the remainder of the tire casing 65 to move relative to the support arms 85, 86 of the support carriage 74 fully onto the rotating rim hub 68. The expandable rim hub 68 can be expanded such that the rim hub 68 engages the inner periphery 250 of the tire casing 65.

Figure 19:
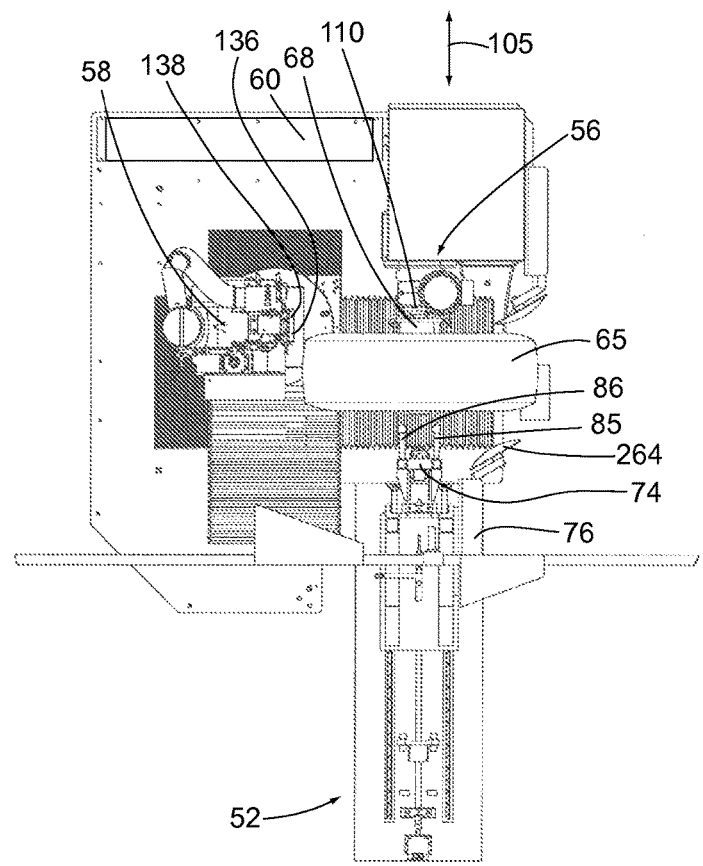
FIGS. 19 and 20 are a top plan view and a downstream end elevation view of the tire buffing station of FIG. 1 as in FIGS. 2 and 3, respectively, but illustrating a tire casing loaded on the rotating expandable rim hub with the loader device in a disengaged position, in which the loader device is in spaced relationship to the tire hub assembly to allow the tire casing to be buffed.

Referring to FIGS. 19 and 20, the tire casing 65 is fully mounted on the tire chuck 110 of the tire hub assembly 56. The loader actuator 76 has been moved from the extended position to the retracted position such that the tire casing engagement member 264 of the loader actuator 76 is in non-contacting relationship with the tire casing 65. No other portion of the loader device 52 is in contacting relationship with the tire casing 65. The loader device 52 is empty, and the support arms 85, 86 of the support carriage 74 are in the lowered, unloading position such that the support arms 85, 86 are below the upper portion 292 of the inner periphery 250 of the tire casing 65. The loader device 52 can retract away from the tire hub assembly 56 to provide space for the rasp assembly to process the tire casing 65 mounted thereto.

A processing operation can be performed upon the tire casing 65 mounted on the tire hub assembly 56. In the illustrated embodiment, a tire buffing process can be performed upon the tire casing 65 mounted to the tire hub assembly 56. In other embodiments, a loader device constructed according to principles of the present disclosure can be used at other stations of the retreading operation to perform other processing operations. For example, in other embodiments, the loader device 52 can be used with a tire hub assembly of a skiving station.

At the illustrated tire buffing station 50, the tire casing 65 loaded on the expandable rim hub 68 can be rotated about the casing rotation or hub axis 105. The rasp pedestal 58 can be moved relative to the tire hub assembly 56 toward the tire hub assembly 56. The rasp head 136 of the rasp pedestal 58 can be engaged with the rotating tire casing 65. The rasp head 136 can be moved along a buffing path to impart a predetermined tire casing profile upon an outer circumferential surface of the buffed tire casing 65. In embodiments, the tire buffing station 50 can include other suitable components of a tire buffer, such as, for example, those shown and described in U.S. Pat. No. 6,745,809, which is incorporated herein by reference.

In embodiments, a machine reader in operable, electrical communication with the control unit can be used to read a machine-readable tire casing identifier device associated with the tire casing 65. A tire casing identification data signal can be transmitted to the control unit 60 upon reading the machine-readable tire casing identifier device. The control unit 60 can execute computer-executable instructions stored on a tangible, computer-readable medium to use the tire casing identification data signal to select the buffing path from a database of buffing paths and to control the rasp head 136 to move along the selected buffing path.

The main rasp 136, upon completion of the buffing step, can be positioned with respect to the tire casing 65 to trim the shoulders thereof. The desired shoulder geometry can vary depending on the tire tread being used in the retreading process.

In embodiments, the control unit 60 can be used to operate the rasp pedestal 58 to perform an automated shoulder texturing feature carried out by the texturing device 138. In the automated shoulder texturing operation, the texturing device 138 can be moved with respect to the tire casing 65 with the texturing device 138 being aligned with one of the shoulders. The rasp pedestal 58 is moved with respect to the tire casing 65 such that the texturing device 138 is aligned with the other shoulder, and the same process is repeated for that shoulder.

FIGS. 21-28 illustrate an unloading sequence for one embodiment of a method of retreading a tire casing. In embodiments, after imparting the predetermined tire casing profile upon the outer circumferential surface of the buffed tire casing, the expandable rim hub 68 can be contracted such that the rim diameter is less than the diameter of the inner periphery 250 of the processed tire casing 65.

Figure 21:
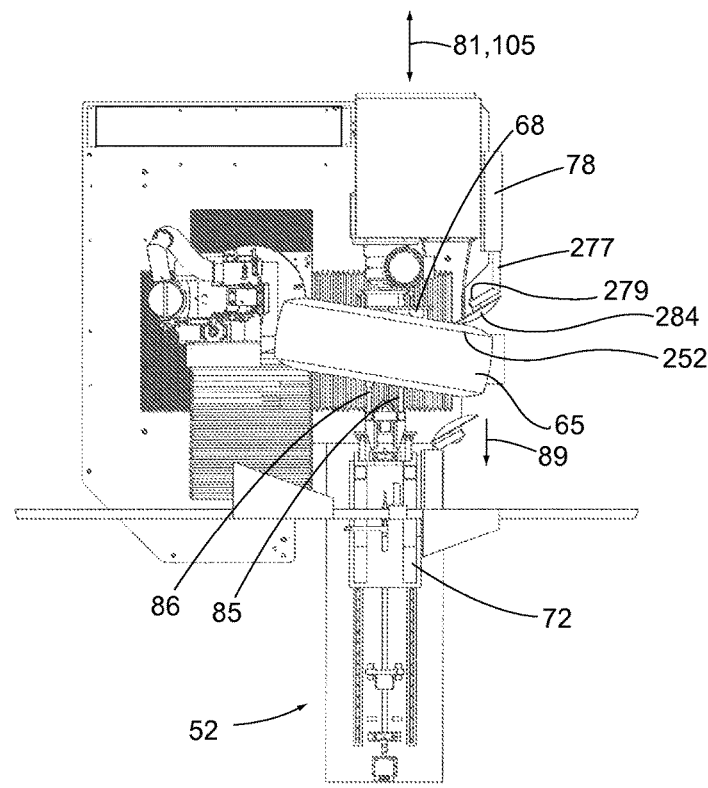
FIGS. 21-28 are four pairs of top plan and downstream end elevation views of the tire buffing station of FIG. 1 as in FIGS. 2 and 3, respectively, but illustrating the loader device in a tire buffer position, in which the loader device is in proximate relationship to the tire hub assembly, and depicting the loader device sequentially performing an unloading operation, in which the tire casing supported by the expandable rim hub is automatically moved onto the loader device.
Figure 22:
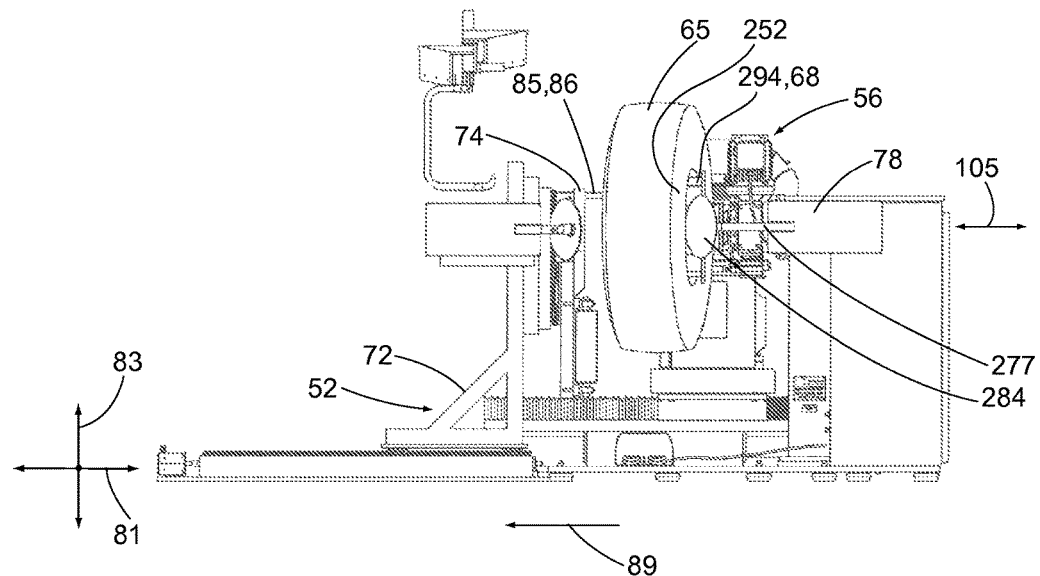

Referring to FIGS. 21 and 22, the support pedestal 72 of the loader device 52 is in the terminal tire hub position along the longitudinal axis 81. The support carriage 74 is in the lowered, unloading position such that the support arms 85, 86 are disposed below the upper portion 294 of the rim hub 68 of the tire hub assembly 56. The processed tire casing 65 can be unloaded from the expandable rim hub 68 of the tire hub assembly 56 by using the dismount actuator 78 of the loader device 52 to move the processed tire casing 65 relative to the expandable rim hub 68 along the hub axis 105. In FIGS. 21 and 22, the piston 277 of the dismount actuator 78 is in an intermediate position such that the engagement member 284 disposed at the distal end 279 is in engaging relationship with the leading edge portion 252 of the tire casing 65. Through the effects of gravity, the processed tire casing 65 is unloaded from the expandable rim hub 68 onto the support arms 85, 86 of the loader device 52, which are disposed below the upper portion 294 of the expandable rim hub 68 of the tire hub assembly 56.

In the unloading sequence, the tire casing 65 loaded on the expandable rim hub 68 can be rotated about the hub axis 105. The tire casing 65 is unloaded from the expandable rim hub 68 in response to moving the piston 277 of the dismount actuator 78 from a retracted position to an intermediate position. The dismount actuator 78 moves the leading edge portion 252 of the rotating tire casing 65 relative to the support arms 85, 86 such that the leading edge 252 of the tire casing 65 engages at least one of the support arms 85, 86. The engagement member 284 can rotate in response to the rotating processed tire casing 65 with which it is in engaging contact.

Figure 23:
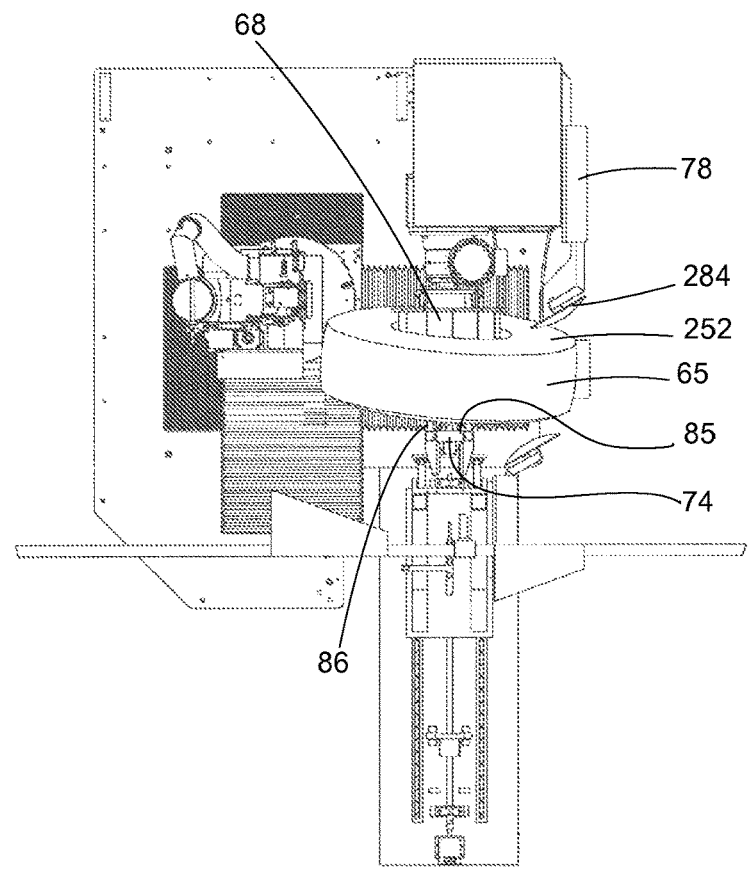
Figure 24:
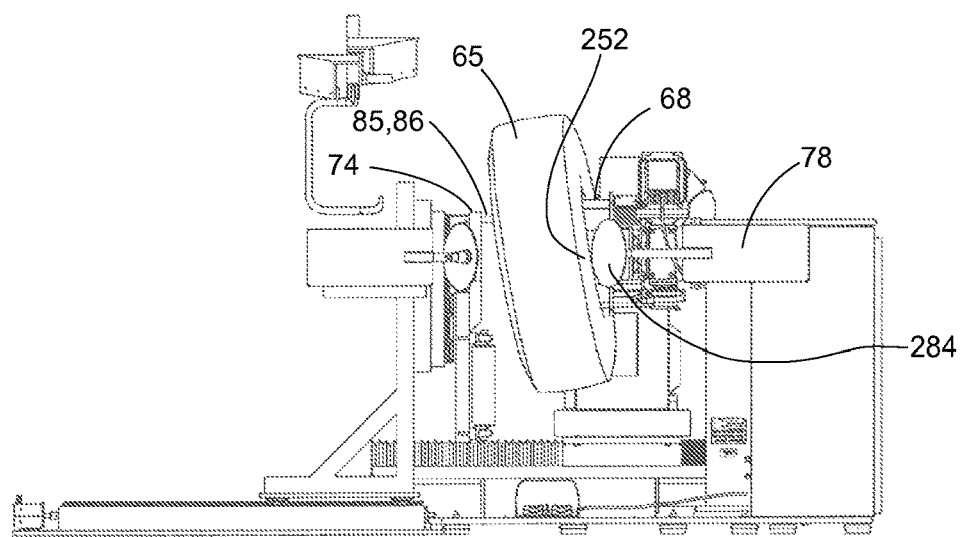

Referring to FIGS. 23 and 24, the rotating rim hub 68 rotatively moves the leading edge portion 252 of the processed tire casing 65 further onto the support arms 85, 86 of the loader device 52 such that at least a portion of the tire casing 65 is supported by both support arms 85, 86. The engagement member 284 of the dismount actuator 78 can rotate in response to the rotational movement of the tire casing 65, which is in engaging contact with the engagement member 284. The support arms 85, 86 can rotate about their shafts relative to the frame 238 of the support carriage 74 in response to the rotating movement of the processed tire casing 65 dismounting from the rotating rim hub 68 and moving to a supported position upon the support arms 85, 86.

Figure 26:
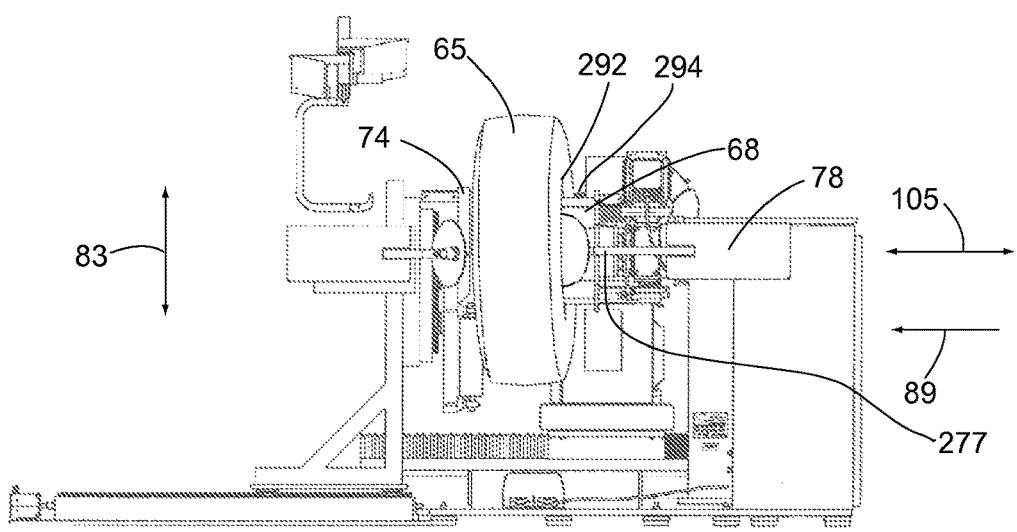

Referring to FIGS. 25 and 26, the piston 277 of the dismount actuator 78 is moved to an extended position to further translate the tire casing 65 along the hub axis 105 in the unloading direction 88 off of the rim hub 68. Continued rotation of the rim hub 68 about the hub axis 105 has caused a remainder portion of the tire casing 65 to move onto the support arms 85, 86. Referring to FIG. 26, the support carriage 74 has been moved upwardly along the normal axis 83 to the raised position such that the upper portion 292 of the inner periphery 250 of the tire casing 65 is above the upper portion 294 of the rim hub 68.

Figure 27:
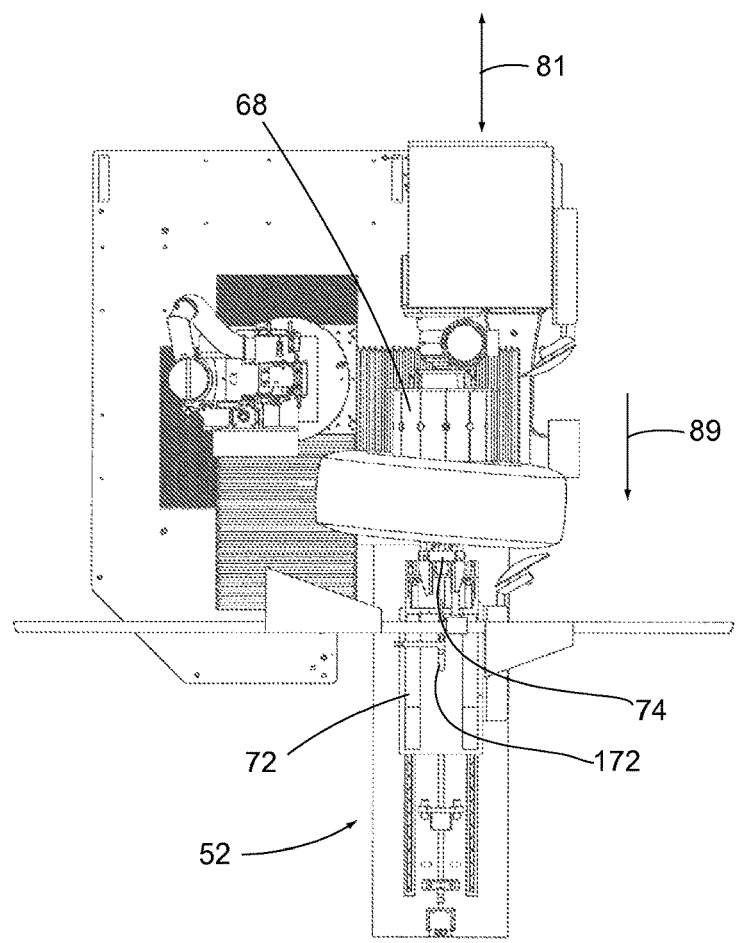
Figure 28:
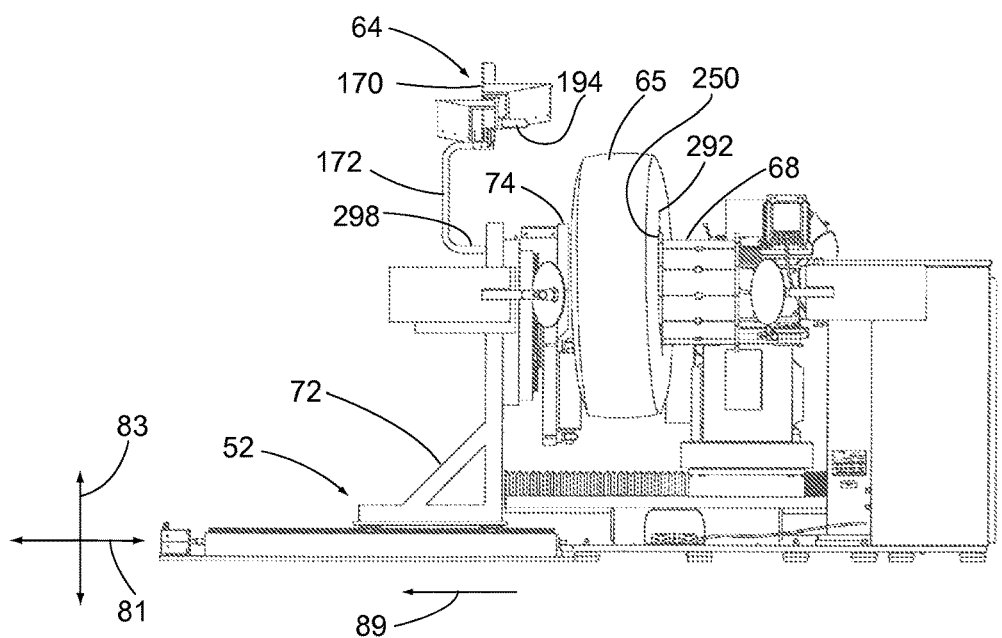

Referring to FIGS. 27 and 28, the support pedestal 72 of the loader device 52 has moved in the unloading direction 89 along the longitudinal axis 81 from the terminal tire hub position, as shown in FIGS. 22 and 23, to an intermediate position. The processed tire casing 65 is supported by the support carriage 74 of the loader device 52. Continued movement of the support pedestal 72 in the unloading direction 89 will completely unload the processed tire casing from the expandable rim hub 68. The processed tire casing 65 can be placed upon a carrier hook 172 of the tire casing conveyor 64 disposed at the station position along the monorail 170.

Referring to FIG. 28, the support pedestal 72 can be moved along the longitudinal axis 81 in the unloading direction 89 to the conveyor loading position. The support carriage 74 can be disposed along the normal axis 83 in the elevated position such that the upper portion 292 of the inner periphery 250 of the processed tire casing 65 is disposed above a support member 298 of the carrier hook 172 disposed in the station position along the monorail 170. The support arms 85, 86 can be lowered by moving the support carriage 74 along the normal axis 83 to lower the buffed tire casing 65 onto the support member 298 of the carrier hook 172, such as shown in FIG. 9. The support carriage 74 can be moved further along the normal axis 83 to a lowered position such that the tire casing 65 is no longer borne by the support arms 85, 86 of the support carriage 74, but rather is mounted to the carrier hook 172 of the tire casing conveyor 64.

The support pedestal 72 can be moved further in the unloading direction 89 along the longitudinal axis 81 to the home position, such as shown in FIG. 1, such that the support pedestal 72 and the support carriage 74 are disposed in offset relationship to the processed tire casing 65 supported by the carrier hook 172 of the conveyor 64 to allow the station hook stop mechanism 194 of the tire casing conveyor 64 to be moved to the retracted position. The processed tire casing 65 can then move along the conveyor 64 to a downstream retreading station, such as a skiving station, for example.

After being buffed, the tire casing 65 may then be examined for damaged areas at a skiving station, which are skived and filled with a repair gum. After completion of the skiving process, the buffed surface may be sprayed with tire cement that provides a tacky surface for application of a suitable layer of bonding material, such as cushion gum. Conventionally, the cushion gum is a layer of uncured rubber material, which optionally includes a low temperature vulcanizing agent and accelerator. The cushion gum can be placed over the crown. In some retreading operations, the spray cement can be omitted.

Then a cured tread strip, typically of a width corresponding to the width of the crown of the casing is cut to the length corresponding to the casing circumference and is disposed over the casing crown. Alternatively, continuous replacement treads in the shape of a ring (i.e., ring treads) have also been used to retread the buffed casing. A roller pressing process, commonly referred to as stitching, is next performed on the assembly to force air from between the tread strip and casing.

After stitching the tire assembly, which comprises the tire casing, the cushion gum and the tread, the assembly can be placed within a flexible rubber envelope. An airtight seal can be created between the envelope and the bead of the tire casing. The entire envelope, with the tire assembly disposed therein, can be placed within a curing chamber and subjected to elevated pressure and temperature for a predetermined period of time. The combination of exposure to elevated pressure and temperature for a duration of time binds the cushion gum to both the tire casing and the new tire tread.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A loader device for use with the mounting of a tire casing on an expandable rim hub, the device comprising:
a support pedestal, the support pedestal movable over a range of longitudinal travel along a longitudinal axis;
a support carriage movably mounted to the support pedestal, the support carriage movable over a range of vertical travel along a normal axis, the normal axis being substantially perpendicular to the longitudinal axis, the support carriage having a support arm adapted to engage an inner periphery of the tire casing and support the tire casing independently of the expandable rim hub;
a loader actuator mounted to at least one of the support pedestal and the support carriage, the loader actuator adapted to selectively move, relative to the support arm, at least a portion of the tire casing supported upon the support arm in a loading direction along the longitudinal axis off of the support arm,
wherein the expandable rim hub is adapted to support and selectively rotate the tire casing about a hub axis, the hub axis being substantially parallel with the longitudinal axis.

2. The device of claim 1, wherein the support carriage includes a frame and a pair of support arms mounted to the frame, the support arms being in spaced relationship to each other and extending from the frame along the longitudinal axis.

3. The device of claim 2, wherein the support arms are rotatably mounted to the frame.

4. The device of claim 2, wherein at least one of the support arms has a generally spherical distal end.

5. The device of claim 2, wherein the support carriage includes a roller journaled on the frame for rotation, the roller being disposed in spaced relationship to the support arms along the normal axis and positioned to support the tire casing borne on the support arms.

6. The device of claim 1, wherein the loader actuator is movably mounted to the support pedestal.

7. The device of claim 1, wherein the loader actuator comprises a cylinder actuator having a body and a piston, the piston housed within the body such that a distal end of the piston extends from the body, the piston reciprocally movable with respect to the body.

8. The device of claim 7, wherein the cylinder actuator includes a tire casing engagement member rotatably mounted to the distal end of the piston.

9. The device of claim 8, wherein the engagement member has an exterior convex surface.

10. The device of claim 1, further comprising:
an unloader actuator adapted for mounting to a tire hub assembly for supporting and rotating the tire casing, the tire hub assembly including the expandable rim hub, the unloader actuator adapted to selectively move, relative to the support arm, at least a portion of the tire casing supported upon the expandable rim hub in an unloading direction along the longitudinal axis off of the expandable rim hub when the rim hub is contracted to a size that is less than an inner casing diameter defined by an inner periphery of the tire casing supported upon the expandable rim hub.

11. A tire retreading system comprising:
a tire hub assembly adapted to support and selectively rotate a tire casing about a rotational axis, the tire hub assembly having a tire chuck with an expandable rim hub adapted to selectively expand to retentively engage the tire casing mounted on the tire chuck, the expandable rim hub movable between a contracted position and a range of expanded positions wherein the diameter of the expandable rim hub is greater in the expanded positions than in the contracted position;
a loader device arranged with respect to the tire hub assembly to selectively load the tire casing upon the tire hub assembly, the loader device including:
a support pedestal, the support pedestal movable over a range of longitudinal travel along a longitudinal axis, the longitudinal axis being substantially parallel with the rotational axis,
a support carriage movably mounted to the support pedestal, the support carriage movable over a range of vertical travel along a normal axis, the normal axis being substantially perpendicular to the longitudinal axis, the support carriage having a support arm adapted to engage an inner periphery of the tire casing and support the tire casing independently of the expandable rim hub,
a loader actuator mounted to at least one of the support pedestal and the support carriage, the loader actuator is adapted to selectively move, relative to the support arm, at least a portion of the tire casing supported upon the support arm in a loading direction along the longitudinal axis off of the support arm onto the expandable rim hub.

12. The tire retreading system of claim 11, wherein the tire hub assembly and the loader comprise portions of a tire buffing station, the tire buffing station including a rasp pedestal adapted to be selectively movable relative to the tire hub assembly, the rasp pedestal having a rasp head, the rasp pedestal being adapted to be selectively moved into engagement with the tire casing mounted to the tire hub assembly such that the rasp head contacts the tire casing to buff the tire casing to impart a predetermined tire casing profile.

13. The tire retreading system of claim 11, wherein the support carriage includes a frame, a pair of support arms, and a roller, the support arms rotatably mounted to the frame, the support arms being in spaced relationship to each other and extending from the frame along the longitudinal axis, the roller journaled on the frame for rotation, and the roller being disposed in spaced relationship to the support arms along the normal axis and positioned to support the tire casing borne on the support arms.

14. The tire retreading system of claim 13, wherein the support arms are rotatably mounted to the frame, the loader actuator comprises a cylinder actuator having a body and a piston, the piston housed within the body such that a distal end of the piston extends from the body, the piston reciprocally movable with respect to the body and having the tire casing engagement member rotatably mounted to the distal end of the piston.

15. The tire retreading system of claim 11, further comprising:
an unloader actuator mounted to the tire hub assembly, the unloader actuator adapted to selectively move, relative to the support arm, at least a portion of the tire casing supported upon the expandable rim hub in an unloading direction along the longitudinal axis off of the expandable rim hub and onto the support arm of the loader device when the rim hub is contracted to a size that is less than an inner casing diameter defined by an inner periphery of the tire casing supported upon the expandable rim hub.

16. A method of retreading a tire casing comprising:
moving the tire casing toward a tire hub assembly along a longitudinal axis, an inner periphery of the tire casing supported by the support arm of the loader device independently of an expandable rim hub such that an upper portion of the inner periphery of the tire casing is disposed above an upper portion of the expandable rim hub of the tire hub assembly, the expandable rim hub being in a contracted position, the expandable rim hub having a rim diameter when in the contracted position that is smaller than an inner casing diameter defined by the inner periphery of the tire casing;
loading the tire casing onto the expandable rim hub of the tire hub assembly by using a loader actuator of the loader device to move at least a portion of the tire casing relative to the support arm such that said portion moves in a loading direction along the longitudinal axis off of the support arm and into engagement with the expandable rim hub;
expanding the expandable rim hub such that the rim engages the inner periphery of the tire casing,
wherein the expandable rim hub is adapted to support and selectively rotate the tire casing about a casing rotation axis, the casing rotation axis being substantially parallel with the longitudinal axis.

17. The method of retreading a tire casing according to claim 16, further comprising:
rotating the expandable rim hub;
wherein the tire casing is loaded onto the expandable rim hub by moving a leading edge portion of the tire casing relative to the support arm such that the leading edge of the tire casing engages the rotating rim, the rotating rim rotatively moving the leading edge of the tire casing such that a remainder portion of the tire casing is moved onto the rotating rim.

18. The method of retreading a tire casing according to claim 16, further comprising:

before moving the tire casing along the longitudinal axis toward the tire hub assembly, removing the tire casing from a carrier hook of a tire casing conveyor system disposed at a loading position by using the support arm to lift the tire casing off of the carrier hook.

19. The method of retreading a tire casing according to claim 16, further comprising:
performing a processing operation upon the tire casing;
after performing the processing operation, contracting the expandable rim hub;
unloading the processed tire casing from the expandable rim hub of the tire hub assembly by using a dismount push arm of the loader device to move the processed tire casing relative to the expandable rim hub along the casing rotation axis.

20. The method of retreading a tire casing according to claim 19, wherein the processed tire casing is unloaded from the expandable rim hub onto the support arm of the loader device, the support arm being disposed below the upper portion of the expandable rim hub of the tire hub assembly.

21. The method of retreading a tire casing according to claim 20, further comprising:
rotating the tire casing loaded on the expandable rim hub about the casing rotation axis;
wherein the tire casing is unloaded from the expandable rim hub by moving a leading edge portion of the rotating tire casing relative to the support arm such that the leading edge of the tire casing engages the support arm, the rotating rim rotatively moving a remainder portion of the tire casing such that the remainder portion of the tire casing is moved onto the support arm.

22. The method of retreading a tire casing according to claim 20, further comprising:
after unloading the processed tire casing from the expandable rim hub of the tire hub assembly, placing the processed tire casing upon a carrier hook of a tire casing conveyor system disposed at a loading position by using the support arm to lower the processed tire casing onto the carrier hook.

23. The method of retreading a tire casing according to claim 16, further comprising:
rotating the tire casing loaded on the expandable rim hub about the casing rotation axis;
moving a rasp pedestal relative to the tire hub assembly toward the tire hub assembly, the rasp pedestal including a rasp head; engaging the rasp head with the rotating tire casing;
moving the rasp head along a buffing path to impart a predetermined tire casing profile upon an outer circumferential surface of the processed tire casing.

24. The method of retreading a tire casing according to claim 23, further comprising:
using a machine reader to read a machine-readable tire casing identifier device associated with the tire casing;
transmitting a tire casing identification data signal to a processor upon reading the machine-readable tire casing identifier device;
executing, by the processor, computer-executable instructions stored on a tangible, computer-readable medium to use the tire casing identification data signal to select the buffing path from a database of buffing paths and to control the rasp head to move along the selected buffing path.

25. The method of retreading a tire casing according to claim 23, further comprising:
after imparting the predetermined tire casing profile upon the outer circumferential surface of the processed tire casing, contracting the expandable rim hub;
unloading the processed tire casing from the expandable rim hub of the tire hub assembly by using a dismount push arm of the loader device to move the processed tire casing relative to the expandable rim hub along the casing rotation axis.

* * * * *